US012677315B2

(12) United States Patent
Guo et al.

(10) Patent No.: US 12,677,315 B2
(45) Date of Patent: Jul. 7, 2026

(54) CHANNEL ACCESS METHOD FOR MULTI-LINK DEVICE AND RELATED APPARATUS

(71) Applicant: Huawei Technologies Co., Ltd., Shenzhen (CN)

(72) Inventors: Yuchen Guo, Shenzhen (CN); Yunbo Li, Shenzhen (CN); Yiqing Li, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 655 days.

(21) Appl. No.: 18/177,987

(22) Filed: Mar. 3, 2023

(65) Prior Publication Data

US 2023/0209600 A1    Jun. 29, 2023

Related U.S. Application Data

(63) Continuation of application No. PCT/CN2021/115829, filed on Aug. 31, 2021.

(30) Foreign Application Priority Data

Sep. 4, 2020    (CN) .......................... 202010924423.8

(51) Int. Cl.
*H04W 74/0808*    (2024.01)
*H04W 56/00*    (2009.01)
(52) U.S. Cl.
CPC ... *H04W 74/0808* (2013.01); *H04W 56/0055* (2013.01)

(58) Field of Classification Search
CPC ...................... H04W 74/0808; H04W 56/0055
See application file for complete search history.

(56) References Cited

U.S. PATENT DOCUMENTS

| | | | |
|---|---|---|---|
| 2017/0289987 A1 | 10/2017 | Seok | |
| 2019/0104004 A1 | 4/2019 | Hedayat | |
| 2021/0266137 A1* | 8/2021 | Monajemi | ............. H04L 5/0096 |

(Continued)

FOREIGN PATENT DOCUMENTS

| | | |
|---|---|---|
| WO | 2017160470 A1 | 9/2017 |
| WO | 2020032633 A1 | 2/2020 |

OTHER PUBLICATIONS

Jason Yuchen Guo et al, Short Frame in Blindness Issue of NSTR, IEEE 802.11-21/0266r0, Jan. 26, 2021, 9 pages.

(Continued)

*Primary Examiner* — Sulaiman Nooristany
(74) *Attorney, Agent, or Firm* — Slater Matsil, LLP

(57) ABSTRACT

This application relates to the field of wireless communication, for example, being applied to a wireless local area network supporting the 802.11be standard, and in particular, relates to a channel access method for a multi-link device and a related apparatus. The method includes: when a length of a first PPDU transmitted on a first link by a first multi-link device is less than or equal to a first value, skipping starting, by the first multi-link device, a medium synchronization delay timer on a second link, where the first multi-link device is not allowed to perform simultaneous transmitting and receiving on the first link and the second link.

18 Claims, 10 Drawing Sheets

(56) References Cited

U.S. PATENT DOCUMENTS

2021/0315036 A1    10/2021    Jang et al.

OTHER PUBLICATIONS

Jason Yuchen Guo et al, Proposed Draft Text for Short Frame in Blindness Issue, IEEE 802.11-21/0267r3, Mar. 27, 2021, 3 pages.

Yiqing Li et al, Further Discussion about Blindness for non-STR MLD, IEEE 802.11-20/1365r1, Aug. 18, 2020, 9 pages.

Yiqing Li et al, Further Discussion about Blindness for non-STR MLD, IEEE 802.11-20/1365r0, Aug. 18, 2020, 7 pages.

Edward Au, "Specification Framework for TGbe", IEEE 802.11-19/1262r13, Huawei, IEEE P802.11 Wireless LANs, Aug. 20, 2020, total 56 pages, XP068172958.

IEEE Std 802.11-2016, IEEE Standard for Information technology Telecommunications and information exchange between systems Local and metropolitan area networks Specific requirements Part 11: Wireless LAN Medium Access Control (MAC) and Physical Layer (PHY) Specifications, Dec. 7, 2016, total 3534 pages.

Dibakar Das (Intel), Blindness issue for non-STR operations—followup, IEEE 802.11-20/1009r2, IEEE, Internet URL: https://mentor.ieee.org/802.11/dcn/20/11-20-1009-02-00be-multi-link-hidden-terminal-followup.pptx, Jul. 3, 2020, total 12 pages.

IEEE P802.11ax/D6.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Nov. 2019, total 780 pages.

Sindhu Verma (Broadcom), Proposals on unused bandwidth utilizations, IEEE 802.11-20/0363r3, IEEE, Internet URL: https://mentor.ieee.org/802.11/dcn/20/11-20-0363-03-00be-proposals-on-unused-bandwidth-utilizations.pptx, Aug. 26, 2020, total 18 pages.

Jason Yuchen Guo (Huawei Technologies Co. Ltd.), Proposed Draft Text for Short Frame in Blindness Issue, IEEE 802.11-21/0267r0, IEEE, Internet URL:https://mentor.ieee.org/802.11/dcn/21/11-21-0267-00-00be-pdt-mlo-short-frame-in-blindness-issue.docx, Feb. 22, 2021, total 3 pages.

Liuming Lu (OPPO), Discussion on the handling of sequential blindness periods for NSTR MLD, IEEE 802.11-21/1031r0, IEEE, Internet URL:https://mentor.ieee.org/802.11/dcn/21/11-21-1031-00-00be-discussion-on-the-handling-of-sequential-blindness-periods-for-nstr-mld.pptx, Jun. 30, 2021, total 9 pages.

\* cited by examiner

When a type of a first frame transmitted on a first link by a first multi-link device is a first type, the first multi-link device does not start a medium synchronization delay timer on a second link, where the first multi-link device is not allowed to perform simultaneous transmitting and receiving on the first link and the second link

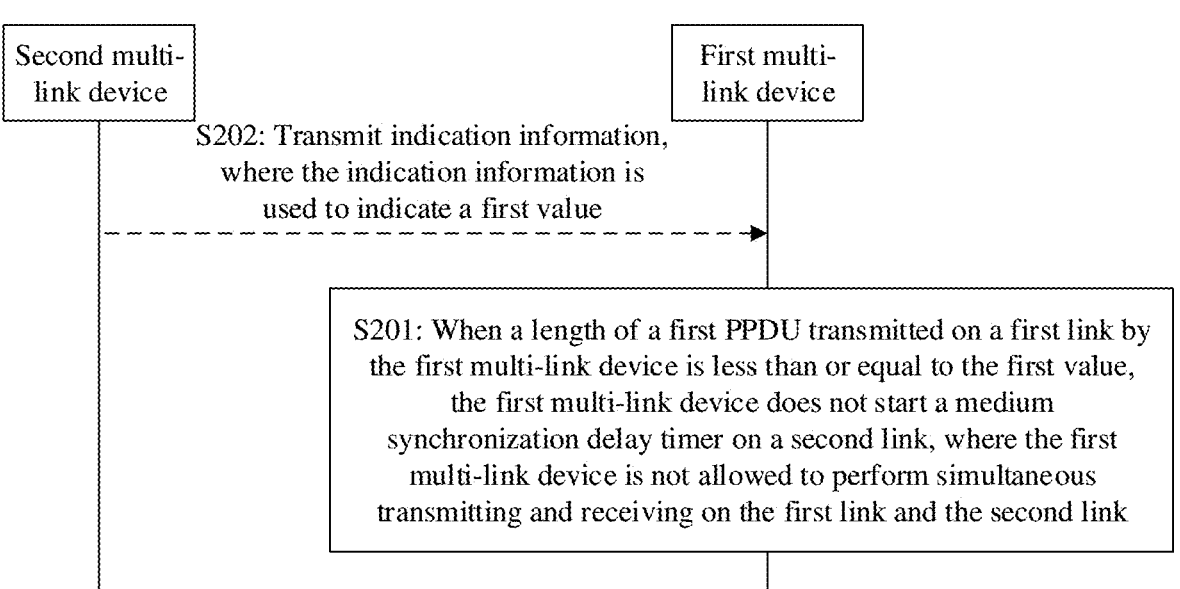

Second multi-link device

First multi-link device

S202: Transmit indication information, where the indication information is used to indicate a first value S201: When a length of a first PPDU transmitted on a first link by the first multi-link device is less than or equal to the first value, the first multi-link device does not start a medium synchronization delay timer on a second link, where the first multi-link device is not allowed to perform simultaneous transmitting and receiving on the first link and the second link

FIG. 5

| Multi-link element<br>Multi-link element | | | | |
|---|---|---|---|---|
| Element ID<br>Element ID | Length<br>Length | Element ID Extension<br>Element ID extension | Multi-Link Control<br>Multi-link control | mediumSyncDelay timer threshold<br>Medium synchronization delay timer threshold | ... | Optional subelements<br>Optional subelements |

FIG. 6A

| EHT operation element | | | | |
|---|---|---|---|---|
| Element ID | Length | Element ID Extension | ... | mediumSyncDelay timer threshold |
| Element ID | Length | Element ID extension | ... | Medium synchronization delay timer threshold |

FIG. 6B

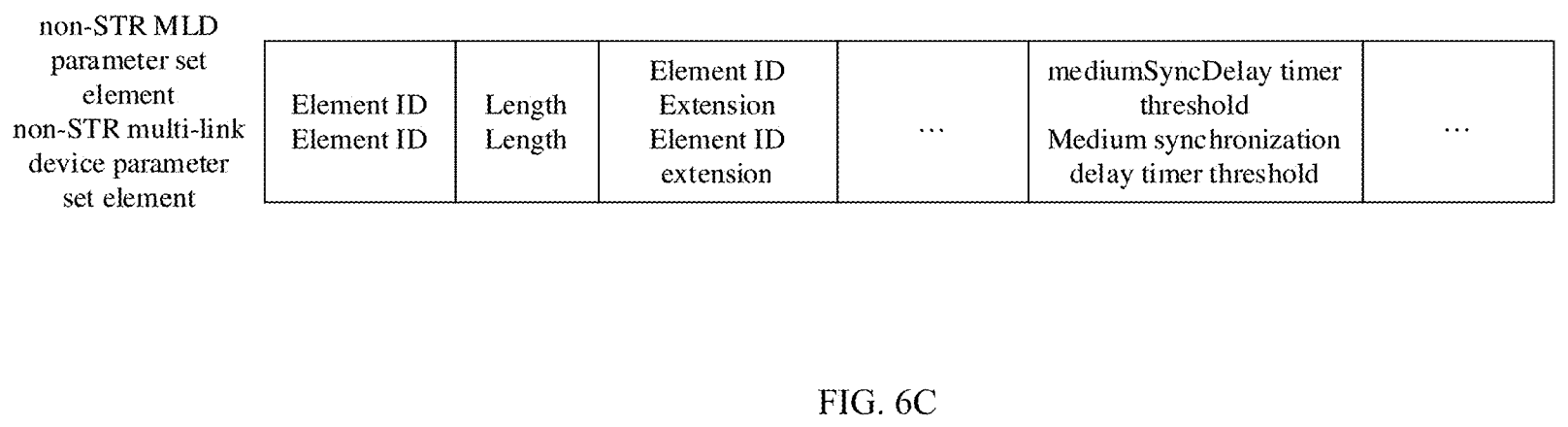

| non-STR MLD parameter set element<br>non-STR multi-link device parameter set element | Element ID<br>Element ID | Length<br>Length | Element ID Extension<br>Element ID extension | ... | mediumSyncDelay timer threshold<br>Medium synchronization delay timer threshold | ... |
|---|---|---|---|---|---|---|

FIG. 6C

CHANNEL ACCESS METHOD FOR MULTI-LINK DEVICE AND RELATED APPARATUS

CROSS-REFERENCE TO RELATED APPLICATIONS

This application is a continuation of International Application No. PCT/CN2021/115829, filed on Aug. 31, 2021, which claims priority to Chinese Patent Application No. 202010924423.8, filed on Sep. 4, 2020. The disclosures of the aforementioned applications are hereby incorporated by reference in their entireties.

TECHNICAL FIELD

This application relates to the field of wireless communication technologies, and in particular, to a channel access method for a multi-link device and a related apparatus.

BACKGROUND

As wireless communication technologies develop, an increasing quantity of wireless communication devices support multi-link communication, for example, performing communication simultaneously on 2.4 GHz, 5 GHz, and 6 GHz frequency bands, or performing communication simultaneously on different channels of a same frequency band. This type of wireless communication device is usually referred to as a multi-link device (MLD). Obviously, the multi-link device can perform parallel communication by using a plurality of links, thereby greatly increasing a transmission rate.

Although the multi-link device can perform parallel communication by using a plurality of links to increase the transmission rate, signal transmission performed on one frequency band affects signal reception performed on another frequency band when a frequency spacing between a plurality of frequency bands supported by an extremely high throughput (EHT) multi-link device is small. For example, the EHT multi-link device performs transmission on a link 1. Because a frequency spacing between the link 1 and a link 2 is small, signal transmission performed on the link 1 causes channel interference to the link 2, affecting channel access and information reception performed on the link 2. Therefore, the device is not allowed to independently perform simultaneous transmission and reception operations on a plurality of frequency bands, to avoid mutual interference. According to current progress of the 802.11 TGbe standard group, it is defined that the EHT multi-link device may have a simultaneous transmitting and receiving (STR) capability and a not simultaneous transmitting and receiving (non-STR) capability.

When an MLD with a non-STR capability (which is referred to as a non-STR MLD for short) performs transmission on a link, the non-STR MLD is in a blind state (a blindness period or referred to as a deaf period) because interference affects clear channel assessment (CCA) performed on another link. The blind state means that any information on a channel cannot be listened to or any information on a channel fails to be listened to. Therefore, when the non-STR MLD is in the blind state on some links, how the non-STR MLD performs channel access on these links becomes an urgent problem to be resolved.

SUMMARY

Embodiments of this application provide a channel access method for a multi-link device and a related apparatus, to improve channel access efficiency when a non-STR MLD is in a blind state/self-interference state.

The following describes this application from different aspects. It should be understood that mutual reference may be made to the following implementations and beneficial effects of the different aspects.

According to a first aspect, this application provides a channel access method for a multi-link device. The method includes: When a length of a first PPDU transmitted on a first link by a first multi-link device is less than or equal to a first value, the first multi-link device does not start a medium synchronization delay timer on a second link. The first multi-link device is not allowed to perform simultaneous transmitting and receiving on the first link and the second link.

That the first multi-link device does not start a medium synchronization delay timer on a second link includes: When performing channel contention on the second link, the first multi-link device sets an energy detection threshold that is used by clear channel assessment CCA performed on the second link to a first threshold, where the first threshold is −62 dBm; or after a back-off counter on the second link backs off to 0, the first multi-link device is allowed to transmit a frame other than an RTS frame and an MU-RTS frame.

In this solution, when a length of a PPDU transmitted on one link is less than or equal to a specific value, the medium synchronization delay timer is not started on another link; or when channel contention is performed on another link, the energy detection threshold used by CCA is set to −62 dBm; or there is no need to use an RTS frame on another link to attempt to detect protection/availability of a channel. Therefore, channel access efficiency or a channel access success rate of the first multi-link device on the another link is improved, or channel access opportunities of the first multi-link device on the another link are increased.

With reference to the first aspect, in a possible implementation, the method further includes: The first multi-link device receives the first value. The first value may be carried in a beacon frame, an association response frame, or a reassociation response frame.

Optionally, the first value may be carried in a multi-link element, an extremely high throughput operation element, or a newly defined element.

With reference to the first aspect, in a possible implementation, the method further includes: When the length of the first PPDU is greater than the first value, the first multi-link device determines an initial value that is of the medium synchronization delay timer and that corresponds to the length of the first PPDU, and starts the medium synchronization delay timer with the initial value on the second link.

Optionally, the method further includes: The first multi-link device receives first indication information. The first indication information is used to indicate a mapping relationship between a physical layer protocol data unit (PPDU) length and an initial value of the medium synchronization delay timer.

In this solution, the initial value of the medium synchronization delay timer is determined based on the length of the first PPDU, enabling more flexible setting of the medium synchronization delay timer.

With reference to the first aspect, in a possible implementation, the method further includes: When the length of the first PPDU is greater than the first value, the first multi-link device starts the medium synchronization delay timer on the second link; and during a time period during which the medium synchronization delay timer runs, if the first multi-link device performs channel contention on the second link, the first multi-link device sets the energy detection threshold that is used by CCA performed on the second link to a threshold corresponding to the length of the first PPDU.

Optionally, before the first multi-link device transmits the first PPDU on the first link, the method further includes: The first multi-link device receives second indication information. The second indication information is used to indicate a mapping relationship between a PPDU length and an energy detection threshold.

In this solution, the energy detection threshold is determined based on the length of the first PPDU. In this case, a channel access mechanism used on the second link is more flexible, improving channel access efficiency.

According to a second aspect, this application provides a first multi-link device or a chip in the first multi-link device, for example, a Wi-Fi chip. The first multi-link device may be a non-STR MLD. The first multi-link device includes a processing unit. The processing unit is configured to: when a length of a first PPDU transmitted on a first link by the first multi-link device is less than or equal to a first value, skip starting a medium synchronization delay timer on a second link. The first multi-link device is not allowed to perform simultaneous transmitting and receiving on the first link and the second link.

The processing unit is specifically configured to set an energy detection threshold that is used by clear channel assessment CCA performed on the second link to a first threshold, where the first threshold is −62 dBm. Alternatively, the first multi-link device further includes a transceiver unit. The transceiver unit is configured to: after a back-off counter on the second link backs off to 0, transmit a frame other than an RTS frame and an MU-RTS frame.

With reference to the second aspect, in a possible implementation, the first multi-link device further includes the transceiver unit. The transceiver unit is further configured to receive the first value. The first value may be carried in a beacon frame, an association response frame, or a reassociation response frame.

Optionally, the first value may be carried in a multi-link element, an extremely high throughput operation element, or a newly defined element.

With reference to the second aspect, in a possible implementation, the processing unit is further configured to: when the length of the first PPDU is greater than the first value, determine an initial value that is of the medium synchronization delay timer and that corresponds to the length of the first PPDU, and start the medium synchronization delay timer with the initial value on the second link.

Optionally, the first multi-link device further includes the transceiver unit. The transceiver unit is further configured to receive first indication information. The first indication information is used to indicate a mapping relationship between a PPDU length and an initial value of the medium synchronization delay timer.

With reference to the second aspect, in a possible implementation, the processing unit is further configured to: when the length of the first PPDU is greater than the first value, start the medium synchronization delay timer on the second link; and during a time period during which the medium synchronization delay timer runs, if the first multi-link device performs channel contention on the second link, set the energy detection threshold that is used by CCA performed on the second link to a threshold corresponding to the length of the first PPDU.

Optionally, the first multi-link device further includes the transceiver unit. The transceiver unit is further configured to receive second indication information. The second indication information is used to indicate a mapping relationship between a PPDU length and an energy detection threshold.

According to a third aspect, this application provides a channel access method for a multi-link device. The method includes: When a type of a first frame transmitted on a first link by a first multi-link device is a first type, the first multi-link device does not start a medium synchronization delay timer on a second link. The first multi-link device is not allowed to perform simultaneous transmitting and receiving on the first link and the second link.

That the first multi-link device does not start a medium synchronization delay timer on a second link includes: When performing channel contention on the second link, the first multi-link device sets an energy detection threshold that is used by clear channel assessment CCA to a first threshold, where the first threshold is −62 dBm; or after a back-off counter on the second link backs off to 0, the first multi-link device is allowed to transmit a frame other than an RTS frame and an MU-RTS frame.

Optionally, when the first frame is any one of the following frames, the type of the first frame is the first type: a request to send (RTS) frame, a multiple user request to send (MU-RTS) frame, a power save-poll (PS-Poll) frame, a CTS frame, a status report (BSR) frame, a bandwidth query report (BQR) frame, a null data packet (NDP) frame, an acknowledge (ACK) frame, and a block acknowledge (BA) frame.

Optionally, the first frame is a request to send (RTS) frame or a multiple user request to send (MU-RTS) frame. If the first multi-link device does not receive a clear to send (CTS) frame on the first link within a preset time period, the first multi-link device does not start the medium synchronization delay timer on the second link.

Optionally, the first frame is a power save-poll (PS-Poll) frame. If the first multi-link device does not receive a data frame or an acknowledge frame on the first link within a preset time period, the first multi-link device does not start the medium synchronization delay timer on the second link.

Optionally, the first frame is a CTS frame. Before the first multi-link device transmits a first PPDU on the first link, the method further includes: The first multi-link device receives an RTS frame or an MU-RTS frame on the first link.

Optionally, the first frame is a status report BSR frame. Before the first multi-link device transmits a first PPDU on the first link, the method further includes: The first multi-link device receives a status report poll BSRP trigger frame on the first link.

Optionally, the first frame is a bandwidth query report BQR frame. Before the first multi-link device transmits a first PPDU on the first link, the method further includes: The first multi-link device receives a bandwidth query report poll BQRP trigger frame on the first link.

Optionally, the first frame is a null data packet NDP frame. Before the first multi-link device transmits a first PPDU on the first link, the method further includes: The first multi-link device receives a beamforming report poll BFRP trigger frame on the first link.

Optionally, the first frame is an ACK frame or a BA frame. Before the first multi-link device transmits a first PPDU on the first link, the method further includes: The first multi-link device receives a data frame or a management frame on the first link.

According to a fourth aspect, this application provides a first multi-link device or a chip in the first multi-link device, for example, a Wi-Fi chip. The first multi-link device may be a non-STR MLD. The first multi-link device includes a processing unit. The processing unit is configured to: when a type of a first frame transmitted on a first link by the first multi-link device is a first type, skip starting a medium synchronization delay timer on a second link. The first multi-link device is not allowed to perform simultaneous transmitting and receiving on the first link and the second link.

The processing unit is specifically configured to set an energy detection threshold that is used by clear channel assessment CCA performed on the second link to a first threshold, where the first threshold is −62 dBm. Alternatively, the first multi-link device further includes a transceiver unit. The transceiver unit is configured to: after a back-off counter on the second link backs off to 0, transmit a frame other than an RTS frame and an MU-RTS frame.

Optionally, when the first frame is any one of the following frames, the type of the first frame is the first type: a request to send (RTS) frame, a multiple user request to send (MU-RTS) frame, a power save-poll (PS-Poll) frame, a CTS frame, a status report (BSR) frame, a bandwidth query report (BQR) frame, a null data packet (NDP) frame, an acknowledge (ACK) frame, and a block acknowledge (BA) frame.

Optionally, the first frame is an RTS frame or an MU-RTS frame. The processing unit is specifically configured to: when the first multi-link device does not receive a clear to send (CTS) frame on the first link within a preset time period, skip starting the medium synchronization delay timer on the second link.

Optionally, the first frame is a PS-Poll frame. The processing unit is specifically configured to: when the first multi-link device does not receive a clear to send PS-Poll frame on the first link within a preset time period, skip starting the medium synchronization delay timer on the second link.

Optionally, the first frame is a CTS frame. The first multi-link device further includes the transceiver unit. The transceiver unit is configured to receive an RTS frame or an MU-RTS frame on the first link.

Optionally, the first PPDU is a status report BSR frame. The first multi-link device further includes the transceiver unit. The transceiver unit is configured to receive a status report poll BSRP trigger frame on the first link.

Optionally, the first PPDU is a bandwidth query report BQR frame. The first multi-link device further includes the transceiver unit. The transceiver unit is configured to receive a bandwidth query report poll BQRP trigger frame on the first link.

Optionally, the first PPDU is a null data packet NDP frame. The first multi-link device further includes the transceiver unit. The transceiver unit is configured to receive a beamforming report poll BFRP trigger frame on the first link.

Optionally, the first PPDU is an ACK frame or a BA frame. The first multi-link device further includes the transceiver unit. The transceiver unit is configured to receive a data frame or a management frame on the first link.

According to a fifth aspect, this application provides a method for determining initial duration of a medium synchronization delay timer. The method includes: A first multi-link device receives first indication information, where the first indication information is used to indicate a mapping relationship between a PPDU length and an initial value (or initial duration) of a medium synchronization delay timer. The first multi-link device determines, based on a length of a first PPDU transmitted on a first link, an initial value that is of the medium synchronization delay timer and that corresponds to the length of the first PPDU, where the initial value is used to determine whether to start the medium synchronization delay timer on a second link. The first multi-link device is not allowed to perform simultaneous transmitting and receiving on the first link and the second link.

Optionally, the first multi-link device determines, based on the initial value that is of the medium synchronization delay timer and that corresponds to the length of the first PPDU, whether to start the medium synchronization delay timer on the second link.

Optionally, if the determined initial value of the medium synchronization delay timer is equal to 0, the first multi-link device does not start the medium synchronization delay timer on the second link. If the determined initial value of the medium synchronization delay timer is equal to 0, the first multi-link device starts the medium synchronization delay timer with the initial value on the second link.

That the first multi-link device starts the mediumSyncDelay timer on the second link may be understood as (or may be described as): During a time period during which the mediumSyncDelay timer runs, the first multi-link device may use a more conservative channel access mechanism on the second link. The more conservative channel access mechanism includes but is not limited to: (1) using a lower energy detection threshold (which is an ED threshold lower than −62 dBm herein) to determine whether a channel is busy; and (2) being mandatory to transmit an RTS frame to attempt to detect availability of a channel.

In this solution, different PPDU lengths/byte lengths correspond to different initial values of the mediumSyncDelay timer, enabling more flexible setting of the mediumSyncDelay timer and improving channel access efficiency.

According to a sixth aspect, this application provides a method for determining initial duration of a medium synchronization delay timer. The method includes: A second multi-link device generates and transmits first indication information. The first indication information is used to indicate a mapping relationship between a PPDU length and an initial value (or initial duration) of a medium synchronization delay timer.

According to a seventh aspect, this application provides a first multi-link device or a chip in the first multi-link device, for example, a Wi-Fi chip. The first multi-link device may be a non-STR MLD. The communication apparatus includes: a transceiver unit, configured to receive first indication information, where the first indication information is used to indicate a mapping relationship between a PPDU length and an initial value of a medium synchronization delay timer; and a processing unit, configured to determine, based on a length of a first PPDU transmitted on a first link, an initial value that is of the medium synchronization delay timer and that corresponds to the length of the first PPDU. The communication apparatus is not allowed to perform simultaneous transmitting and receiving on the first link and the second link.

Optionally, the processing unit is further configured to determine, based on the initial value that is of the medium synchronization delay timer and that corresponds to the length of the first PPDU, whether to start the medium synchronization delay timer on the second link.

Optionally, the processing unit is specifically configured to: if the determined initial value of the medium synchronization delay timer is equal to 0, skip starting the medium synchronization delay timer on the second link; or if the determined initial value of the medium synchronization delay timer is equal to 0, start the medium synchronization delay timer on the second link.

According to an eighth aspect, this application provides a second multi-link device or a chip in the second multi-link device, for example, a Wi-Fi chip. The second multi-link device may be an STR MLD. The communication apparatus includes: a processing unit, configured to generate first indication information, where the first indication information is used to indicate a mapping relationship between a PPDU length and an initial value (or initial duration) of a medium synchronization delay timer; and a transceiver unit, configured to transmit the first indication information.

According to a ninth aspect, this application provides a method for determining an energy detection threshold in a CCA process. The method includes: A first multi-link device receives second indication information, where the second indication information is used to indicate a mapping relationship between a PPDU length and an energy detection threshold. The first multi-link device transmits a first PPDU on a first link. The first multi-link device determines, based on a length of the first PPDU transmitted on the first link, an energy detection threshold corresponding to the length of the first PPDU, where the energy detection threshold is used to determine whether to start a medium synchronization delay timer on a second link. The first multi-link device is not allowed to perform simultaneous transmitting and receiving on the first link and the second link.

Optionally, the first multi-link device determines, based on the energy detection threshold corresponding to the length of the first PPDU, whether to start the medium synchronization delay timer on the second link.

Optionally, if the determined energy detection threshold is equal to −62 dBm, the first multi-link device does not start the medium synchronization delay timer on the second link; or if the determined energy detection threshold is less than −62 dBm, the first multi-link device starts the medium synchronization delay timer on the second link.

In this solution, different PPDU lengths/byte lengths correspond to different energy detection thresholds. In this case, a channel access mechanism used on the second link is more flexible, improving channel access efficiency.

According to a tenth aspect, this application provides a method for determining an energy detection threshold in a CCA process. The method includes: A second multi-link device generates and transmits second indication information. The second indication information is used to indicate a mapping relationship between a PPDU length and an energy detection threshold.

According to an eleventh aspect, this application provides a first multi-link device or a chip in the first multi-link device, for example, a Wi-Fi chip. The first multi-link device may be a non-STR MLD. The communication apparatus includes: a transceiver unit, configured to receive second indication information, where the second indication information is used to indicate a mapping relationship between a PPDU length and an energy detection threshold; and a processing unit, configured to determine, based on a length of a first PPDU transmitted on a first link, an energy detection threshold corresponding to the length of the first PPDU, where the energy detection threshold is used to determine whether to start a medium synchronization delay timer on a second link. The first multi-link device is not allowed to perform simultaneous transmitting and receiving on the first link and the second link.

Optionally, the processing unit is further configured to determine, based on the energy detection threshold corresponding to the length of the first PPDU, whether to start the medium synchronization delay timer on the second link. The communication apparatus is not allowed to perform simultaneous transmitting and receiving on the first link and the second link.

Optionally, the processing unit is specifically configured to: if the determined energy detection threshold is equal to −62 dBm, skip starting the medium synchronization delay timer on the second link; or if the determined energy detection threshold is less than −62 dBm, start the medium synchronization delay timer on the second link.

According to a twelfth aspect, this application provides a second multi-link device or a chip in the second multi-link device, for example, a Wi-Fi chip. The second multi-link device may be an STR MLD. The communication apparatus includes: a processing unit, configured to generate second indication information, where the second indication information is used to indicate a mapping relationship between a PPDU length and an energy detection threshold; and a transceiver unit, configured to transmit the second indication information.

According to a thirteenth aspect, this application provides a first multi-link device, including a processor. Optionally, a transceiver is further included. The processor is configured to: when a length of a first PPDU transmitted on a first link by the first multi-link device is less than or equal to a first value, skip starting a medium synchronization delay timer on a second link. The first multi-link device is not allowed to perform simultaneous transmitting and receiving on the first link and the second link.

In a possible design, the processor is configured to: when a type of a first frame transmitted on the first link by the first multi-link device is a first type, skip starting the medium synchronization delay timer on the second link. The first multi-link device is not allowed to perform simultaneous transmitting and receiving on the first link and the second link.

In a possible design, the transceiver is configured to receive first indication information, where the first indication information is used to indicate a mapping relationship between a PPDU length and an initial value (or initial duration) of the medium synchronization delay timer; and the processor is configured to determine, based on the length of the first PPDU transmitted on the first link, an initial value that is of the medium synchronization delay timer and that corresponds to the length of the first PPDU. The communication apparatus is not allowed to perform simultaneous transmitting and receiving on the first link and the second link.

In a possible design, the transceiver is configured to receive second indication information, where the second indication information is used to indicate a mapping relationship between a PPDU length/byte length and an energy detection threshold; and the processor is configured to determine, based on the length of the first PPDU transmitted on the first link, an energy detection threshold corresponding to the length of the first PPDU, where the energy detection threshold is used to determine whether to start the medium synchronization delay timer on the second link. The first multi-link device is not allowed to perform simultaneous transmitting and receiving on the first link and the second link.

According to a fourteenth aspect, this application provides a second multi-link device, including a processor and a transceiver. The processor is configured to generate first indication information, where the first indication information is used to indicate a mapping relationship between a PPDU length and an initial value (or initial duration) of a medium synchronization delay timer. The transceiver is configured to transmit the first indication information.

In a possible design, the processor is configured to generate second indication information, where the second indication information is used to indicate a mapping relationship between a PPDU length and an energy detection threshold; and the transceiver is configured to transmit the second indication information.

According to a fifteenth aspect, this application provides a first multi-link device. The first multi-link device may exist in a product form of a chip. A structure of the first multi-link device includes an input/output interface and a processing circuit. The input/output interface is configured to receive code instructions and transmit the code instructions to the processing circuit. The processing circuit is configured to: when a length of a first PPDU transmitted on a first link is less than or equal to a first value, skip starting a medium synchronization delay timer on a second link. The first multi-link device is not allowed to perform simultaneous transmitting and receiving on the first link and the second link.

In a possible design, the input/output interface is configured to receive code instructions and transmit the code instructions to the processing circuit; and the processing circuit is configured to: when a type of a first frame transmitted on the first link by the first multi-link device is a first type, skip starting the medium synchronization delay timer on the second link. The first multi-link device is not allowed to perform simultaneous transmitting and receiving on the first link and the second link.

In a possible design, a transceiver is configured to receive first indication information, and the input/output interface is configured to receive the first indication information from the transceiver, and transmit the first indication information to the processing circuit for processing, to obtain a mapping relationship that is between a PPDU length and an initial value (or initial duration) of the medium synchronization delay timer and that is indicated by the first indication information; and the processing circuit is configured to determine, based on the length of the first PPDU transmitted on the first link, an initial value that is of the medium synchronization delay timer and that corresponds to the length of the first PPDU. The initial value is used to determine whether to start the medium synchronization delay timer on the second link. The first multi-link device is not allowed to perform simultaneous transmitting and receiving on the first link and the second link.

In a possible design, the transceiver is configured to receive second indication information, and the input/output interface is configured to receive the second indication information from the transceiver, and transmit the second indication information to the processing circuit for processing, to obtain a mapping relationship that is between a PPDU length and an energy detection threshold and that is indicated by the second indication information; and the processing circuit is configured to determine, based on the length of the first PPDU transmitted on the first link, an energy detection threshold corresponding to the length of the first PPDU. The energy detection threshold is used to determine whether to start the medium synchronization delay timer on the second link. The first multi-link device is not allowed to perform simultaneous transmitting and receiving on the first link and the second link.

According to a sixteenth aspect, this application provides a second multi-link device. The second multi-link device may exist in a product form of a chip. A structure of the second multi-link device includes an input/output interface and a processing circuit. The input/output interface is configured to receive code instructions and transmit the code instructions to the processing circuit. The processing circuit is configured to generate first indication information, where the first indication information is used to indicate a mapping relationship between a PPDU length and an initial value (or initial duration) of a medium synchronization delay timer. The input/output interface is configured to transmit the first indication information to a transceiver. The transceiver is configured to transmit the first indication information.

In a possible design, the input/output interface is configured to receive code instructions and transmit the code instructions to the processing circuit; the processing circuit is configured to generate second indication information, where the second indication information is used to indicate a mapping relationship between a PPDU length and an energy detection threshold; the input/output interface is configured to transmit the second indication information to the transceiver; and the transceiver is configured to transmit the second indication information.

According to a seventeenth aspect, this application provides a computer-readable storage medium. The computer-readable storage medium stores instructions, and when the instructions are run on a computer, the computer is enabled to perform the method according to the first aspect, the third aspect, the fifth aspect, the seventh aspect, the ninth aspect, or the tenth aspect.

According to an eighteenth aspect, this application provides a computer program product including program instructions. When the program instructions are run on a computer, the computer is enabled to perform the method according to the first aspect, the third aspect, the fifth aspect, the seventh aspect, the ninth aspect, or the tenth aspect.

When embodiments of this application are implemented, channel access efficiency can be improved when the non-STR MLD is in a blind state/self-interference state.

BRIEF DESCRIPTION OF THE DRAWINGS

To describe the technical solutions in embodiments of this application more clearly, the following briefly describes the accompanying drawings for describing embodiments.

FIG. 4 is a schematic flowchart of a channel access method for a multi-link device according to an embodiment of this application;

FIG. 5 is another schematic flowchart of a channel access method for a multi-link device according to an embodiment of this application;

FIG. 6A is a schematic diagram of a frame structure of a multi-link element according to an embodiment of this application;

FIG. 6B is a schematic diagram of a frame structure of an EHT operation element according to an embodiment of this application;

FIG. 6C is a schematic diagram of a frame structure of a non-STR MLD parameter set element according to an embodiment of this application;

DETAILED DESCRIPTION OF ILLUSTRATIVE EMBODIMENTS

The following clearly describes the technical solutions in embodiments of this application with reference to the accompanying drawings in embodiments of this application.

For ease of understanding of a channel access method for a multi-link device provided in embodiments of this application, the following describes a system architecture and/or an application scenario of the channel access method for a multi-link device provided in embodiments of this application. It may be understood that the system architecture and/or the scenario described in embodiments of this application are/is intended to describe the technical solutions in embodiments of this application more clearly, and do/does not constitute a limitation on the technical solutions provided in embodiments of this application.

Embodiments of this application provide a channel access method that is applied to a non-STR MLD. By using the method, channel access efficiency can be improved when the non-STR MLD is in a blind state/self-interference state. The channel access method for a multi-link device may be implemented by a communication device in a wireless communication system or a chip or processor in the communication device. The communication device may be a wireless communication device that supports parallel transmission performed on a plurality of links. For example, the communication device may be referred to as a multi-link device or a multi-band device. Compared with a communication device that supports only single-link transmission, the multi-link device has higher transmission efficiency and a higher throughput.

The multi-link device includes one or more affiliated stations (affiliated STA). The affiliated station is a logical station and may operate on a link, a frequency band, or a channel. The affiliated station may be an access point (AP) or a non-access point station (non-AP STA). For ease of description, a multi-link device whose affiliated station is an AP is referred to as a multi-link AP, a multi-link AP device, or an AP multi-link device (AP MLD), and a multi-link device whose affiliated station is a non-AP STA is referred to as a multi-link non-AP, a multi-link non-AP device, or a non-AP multi-link device (non-AP MLD) in this application.

Optionally, one multi-link device may include a plurality of logical stations, each logical station operates on one link, but a plurality of logical stations are allowed to operate on a same link.

Figure 1:
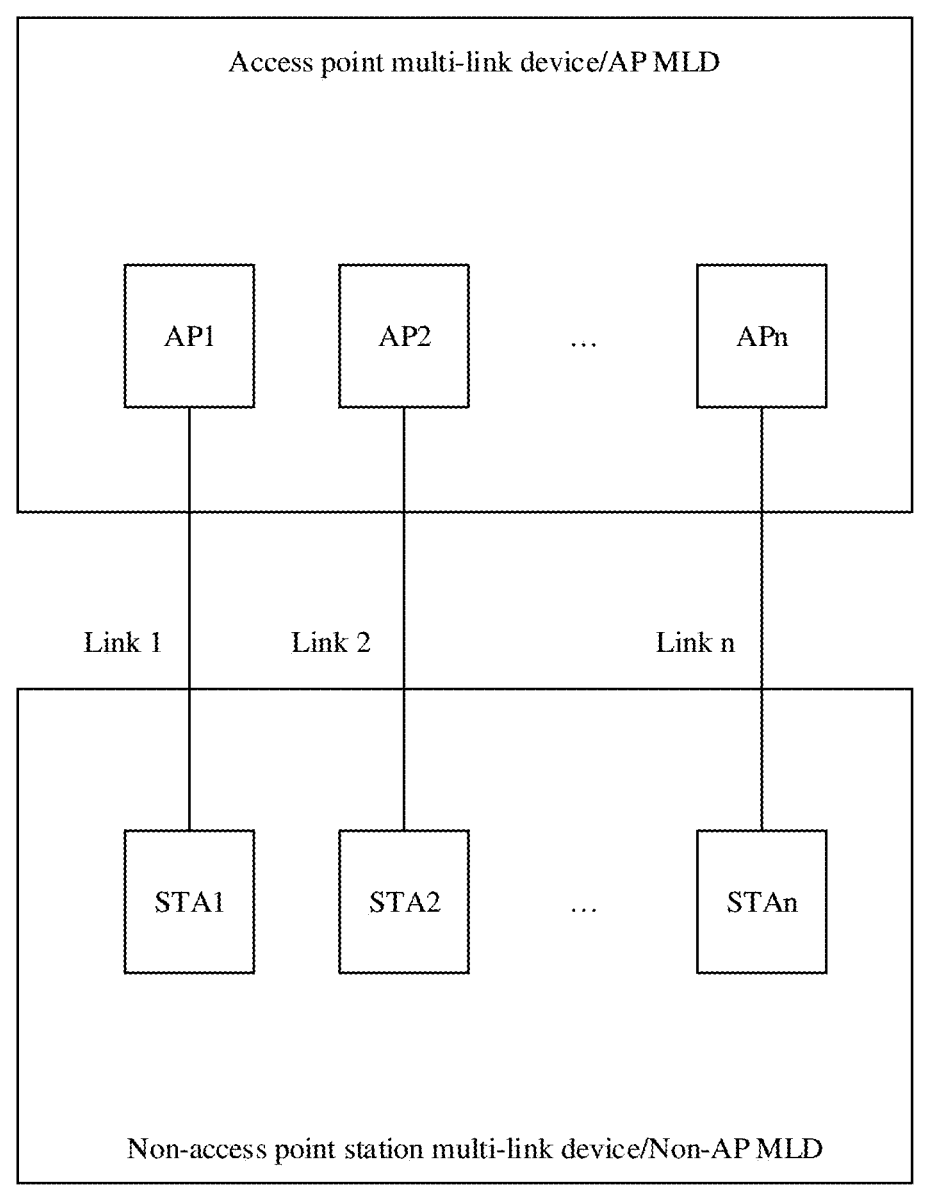
FIG. 1 is a schematic diagram of communication between a non-AP MLD and an AP MLD according to an embodiment of this application.

Optionally, one or more STAs in a non-AP MLD may establish an association relationship with one or more APs in an AP MLD, and then perform communication. FIG. 1 is a schematic diagram of communication between a non-AP MLD and an AP MLD according to an embodiment of this application. As shown in FIG. 1, the AP MLD includes an AP1, an AP2, . . . , and an APn, and the non-AP MLD includes a STA1, a STA2, . . . , and a STAn. The AP MLD and the non-AP MLD may communicate in parallel by using a link 1, a link 2, . . . , and a link n. The STA1 in the non-AP MLD establishes an association relationship with the AP1 in the AP MLD; the STA2 in the non-AP MLD establishes an association relationship with the AP2 in the AP MLD; the STAn in the non-AP MLD establishes an association relationship with the APn in the AP MLD; and the like.

Optionally, the multi-link device may comply with protocols of the IEEE 802.11 series to implement wireless communication. For example, a station complying with an extremely high throughput (EHT), or a station complying with IEEE 802.11be or compatibly supporting IEEE 802.11be implements communication with another device.

The channel access method for a multi-link device provided in embodiments of this application may be applied to a scenario in which one node communicates with one or more nodes, or may be applied to a single-user uplink/downlink communication scenario or a multi-user uplink/downlink communication scenario, or may be applied to a device to device (device to device, D2D) communication scenario. Any one of the foregoing nodes may be an AP MLD, or may be a non-AP MLD, for example, a scenario in which an AP MLD communicates with a non-AP MLD, or a scenario in which an AP MLD communicates with an AP MLD, or a scenario in which a non-AP MLD communicates with a non-AP MLD. This is not limited in embodiments of this application.

Optionally, in any one of the foregoing scenarios, there is at least one node that is not allowed to perform simultaneous transmitting and receiving, that is, capable of non-STR.

Figure 2:
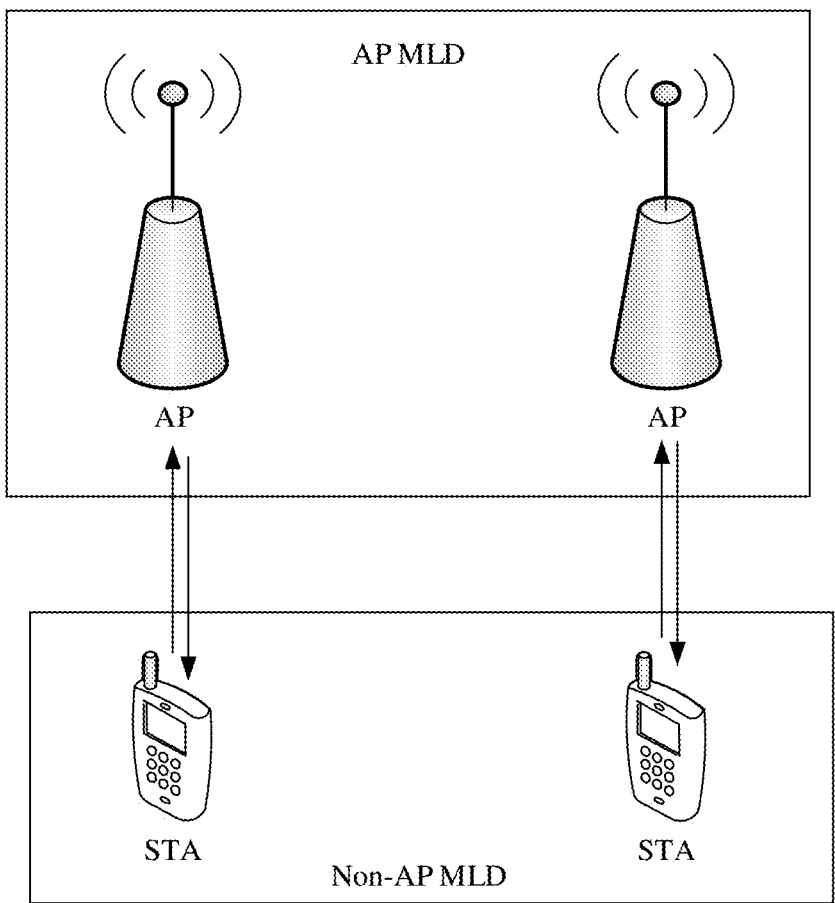
FIG. 2 is a schematic diagram of an architecture of a wireless communication system according to an embodiment of this application.

Optionally, for ease of description, the following describes the system architecture in this application by using the scenario in which an AP MLD communicates with a non-AP MLD as an example. The channel access method for a multi-link device provided in embodiments of this application may be applied to a wireless local area network (WLAN). FIG. 2 is a schematic diagram of an architecture of a wireless communication system according to an embodiment of this application. As shown in FIG. 2, the wireless communication system includes at least one AP MLD and at least one non-AP MLD. The AP MLD is a multi-link device that provides service to the non-AP MLD. The non-AP MLD may communicate with the AP MLD by using a plurality of links. One AP in the AP MLD may communicate with one STA in the non-AP MLD by using one link. It may be understood that a quantity of the AP MLDs and a quantity of the non-AP MLDs in FIG. 2 are merely examples. Optionally, the wireless communication system includes at least one MLD that is capable of non-STR.

For example, a multi-link device (which may be either a non-AP MLD or an AP MLD herein) is an apparatus with a wireless communication function. The apparatus may be an integrated device, or may be a chip, a processing system, or the like installed in the integrated device. A device on which the chip or processing system is installed may implement, under control of the chip or processing system, the method and functions provided in embodiments of this application. For example, the non-AP multi-link device in embodiments of this application has a wireless transceiver function, may support the 802.11 series protocols, and may communicate with the AP multi-link device or another non-AP multi-link device. For example, the non-AP multi-link device is any user communication device that allows a user to communicate with an AP and then communicate with a WLAN. For example, the non-AP multi-link device may be user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, may be an internet of things node in the internet of things, or may be a vehicle-mounted communication apparatus in the internet of vehicles. The non-AP multi-link device may alternatively be a chip and a processing system in the foregoing terminals. The AP multi-link device may be an apparatus that provides service to the non-AP multi-link device, and may support protocols of the 802.11 series. For example, the AP multi-link device may be a communication entity such as a communication server, a router, a switch, or a network bridge; or the AP multi-link device may include various forms of macro base stations, micro base stations, relay stations, and the like. Certainly, the AP multi-link device may alternatively be a chip or processing system in these various forms of devices. The 802.11 protocol may be a protocol that supports 802.11be or is compatible with 802.11be.

It can be understood that the multi-link device may support high-rate and low-latency transmission. With continuous evolution of application scenarios of a wireless local area network, the multi-link device may be further applied to more scenarios, for example, a sensor node (for example, a smart meter, a smart electricity meter, and a smart air detection node) in a smart city, a smart device (for example, a smart camera, a projector, a display, a TV, a stereo, a refrigerator, and a washing machine) in smart home, a node in the internet of things, an entertainment terminal (for example, a wearable device such as an AR and a VR), a smart device (such as a printer and a projector) in a smart office, an IoV device in the internet of vehicles, and some infrastructures (for example, a vending machine, a self-service navigation station of a supermarket, a self-service cash register device, and a self-service ordering machine) in daily life scenarios. A specific form of the multi-link device is not limited in this embodiment of this application, and merely examples are provided herein.

Figure 3A:
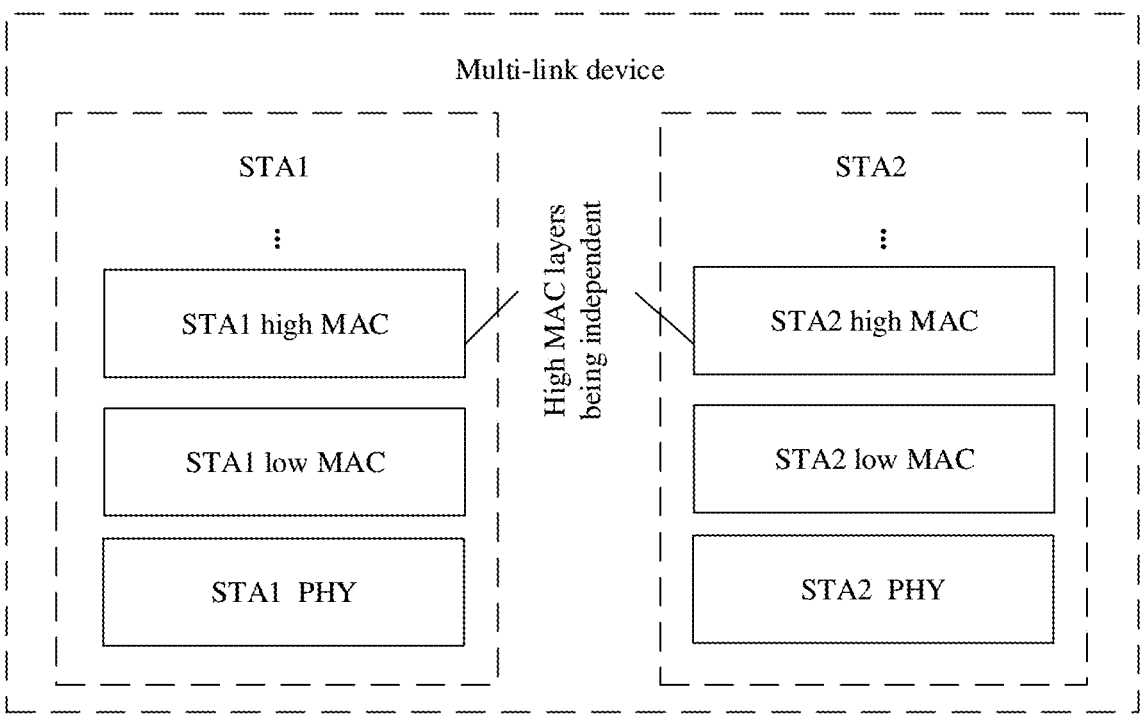
FIG. 3A is a schematic diagram of a structure of a multi-link device according to an embodiment of this application.
Figure 3B:
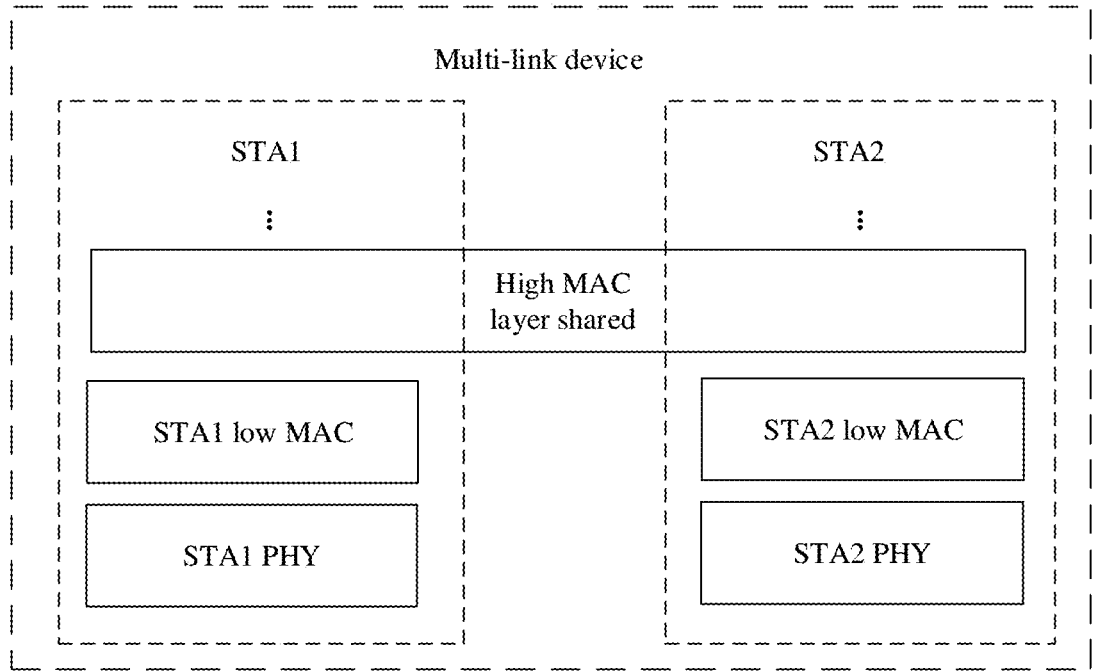
FIG. 3B is a schematic diagram of another structure of a multi-link device according to an embodiment of this application.

Optionally, FIG. 3A is a schematic diagram of a structure of a multi-link device according to an embodiment of this application. The IEEE 802.11 standard focuses on an 802.11 physical layer (PHY) and an 802.11 medium access control (MAC) layer in the multi-link device. As shown in FIG. 3A, a plurality of STAs included in the multi-link device are independent of each other at a low MAC layer and a PHY layer, and are also independent of each other at a high MAC layer. FIG. 3B is a schematic diagram of another structure of a multi-link device according to an embodiment of this application. As shown in FIG. 3B, a plurality of STAs included in the multi-link device are independent of each other at a low MAC layer and a PHY layer, and share a high MAC layer. Certainly, a non-AP multi-link device may use a structure in which high MAC layers are independent of each other, or may use a structure in which a high MAC layer is shared. Likewise, an AP multi-link device may use a structure in which a high MAC layer is shared, or may use a structure in which high MAC layers are independent of each other. A schematic diagram of an internal structure of the multi-link device is not limited in embodiments of this application. FIG. 3A and FIG. 3B are merely examples for description. For example, the high MAC layer or the low MAC layer may be implemented by one processor in a chip system of the multi-link device, or may be implemented by different processing modules in a chip system.

For example, the multi-link device in embodiments of this application may be a single-antenna device, or may be a multi-antenna device, for example, a device with more than two antennas. A quantity of antennas included in the multi-link device is not limited in embodiments of this application. In embodiments of this application, the multi-link device may allow services of a same access class (AC) to be transmitted on different links, and even allow a same data packet to be transmitted on different links; and alternatively, may not allow services of a same access class to be transmitted on different links, but allow services of different access classes to be transmitted on different links.

A frequency band in which the multi-link device works may include one or more frequency bands of sub 1 GHz, 2.4 GHz, 5 GHz, 6 GHz, and a high frequency 60 GHz.

For a non-STR MLD, when the non-STR MLD performs transmission on a link (for example, a link 1), channel interference causes the non-STR MLD to incorrectly determine statuses of channels that are on another link or more links (a link 2 is used as an example), and affects reception of an overlapped basic service set (OBSS) frame on the link 2 by the non-STR MLD. The OBSS frame is used by a station to update a network allocation vector (NAV). Therefore, before transmission performed on a link ends, the non-STR MLD may miss an OBSS frame on another link and further miss NAV updating. In this case, when the non-STR MLD performs channel contention on the link 2 and accesses a channel after transmission performed on the link 1 ends, data transmitted on the link 2 collides with a received OBSS frame. This is referred to as a blind problem or a self-interference problem.

It may be understood that the NAV may be understood as a countdown timer and gradually decreases as time elapses. When the NAV is 0, a medium is considered being in an idle state. Specifically, after a station receives a frame, if a receive address of the frame is not the station, the station may update an NAV based on a duration field in the received frame. If the receive address of the frame is the station, it indicates that the station is a receive station. In this case, the station is not allowed to update the NAV. Before updating the NAV, the station may further determine whether a value of the duration field in the current frame is greater than a current NAV value of the station. If the value of the duration field in the current frame is greater than the current NAV value of the station, the station updates the NAV. If the value of the duration field in the current frame is less than or equal to the current NAV value of the station, the station does not update the NAV. An NAV value existing at a moment at which receiving the frame ends is used for comparison.

To resolve the blind problem of the non-STR MLD, an embodiment of this application proposes a medium synchronization delay (mediumSyncDelay) mechanism. The mechanism is specifically as follows: After performing transmission on a link (for example, a link 1), the non-STR MLD needs to start a timer on another link, that is, a mediumSyncDelay timer. During a time period indicated by the mediumSyncDelay timer, the non-STR MLD needs to use a more conservative channel access mechanism on the link 2.

The more conservative channel access mechanism includes but is not limited to: (1) Whether a channel is busy is determined by using a lower energy detection (ED) threshold. In a channel access mechanism, −62 dBm is usually used as an energy detection threshold. If it is detected that an energy on a channel exceeds the threshold, that is, exceeds −62 dBm, the channel is considered busy. When an ED threshold lower than −62 dBm is used, a signal farther away makes a channel busy in CCA detection. Therefore, channel access is more conservative. The lower energy detection threshold may be −82 dBm, −72 dBm, or the like. (2) A request to send (RTS) frame must be transmitted to attempt to detect availability of a channel. Optionally, there can be only one attempt (or only one transmission of the RTS frame) or a limited quantity of attempts.

In the medium synchronization delay mechanism, as long as the non-STR MLD performs transmission on the link 1, the non-STR MLD uses the more conservative channel access mechanism on the link 2, regardless of a type of a frame transmitted by the non-STR MLD on the link 1. However, frames transmitted by the non-STR MLD on the link 1 are of various types, and may include a control frame, a data frame, or a management frame, and the data frame may be a long frame or a short frame. Therefore, when the non-STR MLD transmits a short frame on the link 1, the non-STR MLD is in a blind state on the link 2 for a short time, accordingly, and there is a low possibility (or probability) that the non-STR MLD misses important information (for example, an NAV) on the link 2. In conclusion, in the medium synchronization delay mechanism, as long as the non-STR MLD performs transmission on the link 1, channel access of the non-STR MLD on the link 2 must be restricted. This results in low channel access efficiency, a low channel access success rate, or a decrease in channel access opportunities on the link 2.

"A non-STR MLD is in a blind state on a link" in this application may be alternatively understood as that a STA that is in the non-STR MLD and that operates on the link is in the blind state.

It may be understood that the "blind state" mentioned in this application may also be referred to as a "self-interference state", an "unable-to-receive state", a "deaf state", or the like.

It may be understood that the "non-STR MLD" in this application may be an EHT MLD that is not allowed to perform simultaneous transmitting and receiving.

It may be understood that the "long frame" and the "short frame" mentioned in this application are distinguished from each other by a length of time during which a frame occupies an air interface. For example, the "long frame" may be a frame that occupies an air interface for a length of time greater than or equal to a preset value A, and the "short frame" may be a frame that occupies an air interface for a length of time less than or equal to a preset value B. The preset value A and the preset value B may be the same or different. For example, the preset value A may be 1 ms (millisecond), and the preset value B may be 100 μs (microseconds).

An embodiment of this application provides a channel access method for a multi-link device, to improve channel access efficiency or a channel access success rate of a non-STR MLD on some links or increase channel access opportunities of the non-STR MLD on these links when the non-STR MLD is in a blind state/self-interference state on these links.

The following describes in detail, with reference to more accompanying drawings, the technical solutions provided in this application.

It may be understood that in this application, a first multi-link device may be a non-STR MLD, and a second multi-link device may be an STR MLD. For ease of subsequent description, a scenario in which two MLDs communicate through two or more links is used as an example for description in this application. In the following embodiments, two links are used as an example to describe the technical solutions of this application. However, the technical solutions of this application are also applicable to two MLDs that support a plurality of links.

The technical solutions provided in this application are elaborated on by using Embodiment 1 to Embodiment 4. In Embodiment 1, how to perform channel access on one link when a frame of a specific type is transmitted on another link is elaborated on. In Embodiment 2, how to determine, based on a length of a frame transmitted on one link, whether a more conservative channel access mechanism needs to be used on another link is elaborated on. In Embodiment 3, how to determine initial duration of a mediumSyncDelay timer is elaborated on. In Embodiment 4, how to determine an ED threshold that is used in a CCA process is elaborated on.

The following describes Embodiment 1 to Embodiment 4 in detail separately. It may be understood that the technical solutions described in Embodiment 1 to Embodiment 4 of this application may be combined arbitrarily to form a new embodiment.

Embodiment 1

In Embodiment 1 of this application, how to determine, based on a type of a frame transmitted on one link, whether a more conservative channel access mechanism needs to be used on another link is described.

FIG. 4 is a schematic flowchart of a channel access method for a multi-link device according to an embodiment of this application. As shown in FIG. 4, the channel access method for a multi-link device includes but is not limited to the following step.

S101: When a type of a first frame transmitted on a first link by a first multi-link device is a first type, the first multi-link device does not start a medium synchronization delay timer on a second link, where the first multi-link device is not allowed to perform simultaneous transmitting and receiving on the first link and the second link.

When the first frame is any one of the following frames, the type of the first frame is the first type: a request to send frame, a multiple user request to send (multiple user RTS) frame, a power save-poll (PS-Poll) frame, a clear to send (CTS) frame, a buffer status report (BSR) frame, a bandwidth query report (BQR) frame, a null data packet (NDP) frame, an acknowledge (ACK) frame, and a block acknowledge (BA) frame.

In a first implementation, the first frame is an RTS frame or an MU-RTS frame. Specifically, if the first multi-link device transmits an RTS frame or an MU-RTS frame on the first link but does not receive a clear to send frame within a preset time period, the first multi-link device does not start the medium synchronization delay timer (mediumSyncDelay timer) on the second link. The first multi-link device is not allowed to perform simultaneous transmitting and receiving on the first link and the second link. In other words, if the first multi-link device does not receive a CTS frame that is on the first link within the preset time period (for example, a sum of a length of a short inter-frame space (SIFS), a length of one slot, and a physical-layer receive delay, that is, a SIFS Time+a Slot Time+a RxPHYStartDelay) after transmitting the RTS/MU-RTS frame on the first link, the first multi-link device does not start the medium-SyncDelay timer on the second link.

That the first multi-link device does not start the mediumSyncDelay timer on the second link may be understood as (or may be described as): When the first multi-link device performs channel contention on the second link, an energy detection threshold used by a CCA operation is a first threshold; or after a back-off counter on the second link backs off to 0, the first multi-link device is allowed to directly transmit a frame other than an RTS frame and an MU-RTS frame. In other words, after the back-off counter on the second link backs off to 0, the first multi-link device does not transmit an RTS/MU-RTS frame to attempt to detect protection/availability of a channel. The first threshold may be −62 dBm.

It may be understood that reasons why the first multi-link device does not receive a CTS frame within the preset time period (for example, a SIFS Time+a Slot Time+a RxPHYStartDelay) may be as follows: (a) The RTS frame transmitted by the first multi-link device collides with a frame transmitted by another device; (b) a receiver corresponding to the RTS frame transmitted by the first multi-link device fails to successfully receive the RTS frame; and (c) a receiver corresponding to the RTS frame transmitted by the first multi-link device is in a busy state.

Optionally, if the first multi-link device starts the mediumSyncDelay timer on the second link after transmitting the RTS/MU-RTS frame on the first link, and the first multi-link device does not receive a CTS frame within the preset time period, the first multi-link device closes (or stops, or cancels) the mediumSyncDelay timer.

Optionally, if the first multi-link device receives a CTS frame within the preset time period, the first multi-link device may start the mediumSyncDelay timer. That the first multi-link device starts the mediumSyncDelay timer on the second link may be understood as (or may be described as): The first multi-link device uses a more conservative channel access mechanism on the second link. To be specific, a lower energy detection threshold (which is an energy detection threshold lower than −62 dBm, for example, −82 dBm) is used to determine whether a channel is busy, and an RTS/MU-RTS frame must be transmitted to attempt to detect availability of a channel. Optionally, there can be only one attempt (or only one transmission of the RTS/MU-RTS frame) or a limited quantity of attempts.

Optionally, the "RTS frame or MU-RTS frame" in the first implementation may be replaced with a power save-poll (PS-Poll) frame, and the "CTS frame" in the first implementation may be replaced with a data frame or an acknowledge (ACK) frame. Therefore, the first implementation may be alternatively described as: If the first multi-link device transmits a PS-Poll frame on the first link but does not receive a data frame or an acknowledge frame within a preset time period, the first multi-link device does not start the medium synchronization delay timer on the second link. Optionally, if the first multi-link device transmits a PS-Poll frame on the first link and receives a data frame or an acknowledge frame within the preset time period, the first multi-link device may start the mediumSyncDelay timer.

It can be learned that when a non-STR MLD (that is, the first multi-link device) in this embodiment of this application transmits an RTS (or MU-RTS) frame on the first link but does not receive a CTS frame, the non-STR MLD does not start the mediumSyncDelay timer on the second link, so that the non-STR MLD performs common channel contention on the second link, that is, the energy detection threshold used by the CCA operation is −62 dBm, or RTS/CTS frames may not be used to attempt to detect protection of a channel. Therefore, channel access efficiency or a channel access success rate of the non-STR MLD on the second link is improved, or channel access opportunities of the non-STR MLD on the second link are increased.

In a second implementation, the first frame is a CTS frame. Specifically, if the first multi-link device receives an RTS frame or an MU-RTS frame on the first link and replies with/transmits a CTS frame on the first link, the first multi-link device does not start the medium synchronization delay timer (mediumSyncDelay timer) on the second link. The first multi-link device is not allowed to perform simultaneous transmitting and receiving on the first link and the second link. In other words, a second multi-link device transmits an RTS frame or an MU-RTS frame on the first link. Correspondingly, the first multi-link device receives the RTS frame or the MU-RTS frame on the first link and replies with/transmits a CTS frame on the first link. After transmitting the CTS frame on the first link, the first multi-link device does not start the mediumSyncDelay timer on the second link.

That the first multi-link device does not start the mediumSyncDelay timer on the second link may be understood as (or may be described as): When the first multi-link device performs channel contention on the second link, an energy detection threshold used by a CCA operation is a first threshold; or after a back-off counter on the second link backs off to 0, the first multi-link device is allowed to directly transmit a frame other than an RTS frame and an MU-RTS frame. In other words, after the back-off counter on the second link backs off to 0, the first multi-link device does not transmit an RTS/MU-RTS frame to attempt to detect protection/availability of a channel. The first threshold may be −62 dBm.

Optionally, if the first multi-link device starts the mediumSyncDelay timer on the second link after transmitting the CTS frame on the first link, the first multi-link device closes (or stops, or cancels) the mediumSyncDelay timer.

Optionally, the "RTS/CTS frame" in the second implementation may be replaced with a status report poll trigger (BSRP Trigger) frame/status report (BSR) frame, or a bandwidth query report poll trigger (BQRP Trigger) frame/bandwidth query report (BQR) frame, or a beamforming report poll trigger (BFRP Trigger) frame/null data packet (NDP) frame, or a data frame/acknowledge (ACK) frame, or a management frame/ACK frame, or a data frame/block acknowledge (BA) frame. Therefore, step S201 may be alternatively described as: The first multi-link device receives a BSRP Trigger frame on the first link and replies with/transmits a BSR frame on the first link; or the first multi-link device receives a BQRP Trigger frame on the first link and replies with/transmits a BQR frame on the first link; or the first multi-link device receives a BFRP Trigger frame on the first link and replies with/transmits an NDP frame on the first link; or the first multi-link device receives a data frame or a management frame on the first link and replies with/transmits an ACK frame on the first link; or the first multi-link device receives a data frame on the first link and replies with/transmits a BA frame on the first link. Correspondingly, the second implementation may be alternatively described as: After transmitting a BSR frame, a BQR frame, or an NDP frame on the first link, the first multi-link device does not start the medium synchronization delay timer on the second link.

It may be understood that after replying with/transmitting a CTS frame, an NDP frame, a BSR frame, a BQR frame, an ACK frame, or a BA frame on the first link, the first multi-link device is in a receive state on the first link. Therefore, reception on the first link does not affect channel contention performed on the second link. In this case, the first multi-link device may perform common channel contention on the second link, that is, the energy detection threshold used by the CCA operation is −62 dBm, or RTS/CTS frames may not be used to attempt to detect protection of a channel.

It can be learned that after a non-STR MLD (that is, the first multi-link device) in this embodiment of this application receives an RTS (or MU-RTS) frame on the first link and replies with a CTS frame, the non-STR MLD does not start the mediumSyncDelay timer on the second link. This can improve channel access efficiency or a channel access success rate of the non-STR MLD on the second link, or increase channel access opportunities of the non-STR MLD on the second link.

In this embodiment of this application, when a frame of a specific type is transmitted on the first link, the medium synchronization delay timer is not started on the second link. Therefore, when the non-STR MLD is in a blind state/self-interference state on some links, channel access efficiency or a channel access success rate of the non-STR MLD on these links can be improved, or channel access opportunities of the non-STR MLD on these links can be increased.

Embodiment 2

In Embodiment 2 of this application, how a non-STR MLD performs channel access on a second link when a length of a PPDU transmitted on a first link by the non-STR MLD is less than a preset value is described.

FIG. 5 is another schematic flowchart of a channel access method for a multi-link device according to an embodiment of this application. As shown in FIG. 5, the channel access method for a multi-link device includes but is not limited to the following steps.

S201: When a length of a first PPDU transmitted on a first link by a first multi-link device is less than or equal to a first value, the first multi-link device does not start a medium synchronization delay timer on a second link, where the first multi-link device is not allowed to perform simultaneous transmitting and receiving on the first link and the second link.

That the first multi-link device does not start a medium-SyncDelay timer on a second link may be understood as (or may be described as): When the first multi-link device performs channel contention on the second link, an energy detection threshold used by a CCA operation is a first threshold; or after a back-off counter on the second link backs off to 0, the first multi-link device is allowed to directly transmit a frame other than an RTS frame and an MU-RTS frame. In other words, after the back-off counter on the second link backs off to 0, the first multi-link device does not transmit an RTS/MU-RTS frame to attempt to detect protection/availability of a channel. The first threshold may be −62 dBm.

Optionally, if the first multi-link device starts the mediumSyncDelay timer on the second link after transmitting the first PPDU on the first link, the first multi-link device closes (or stops, or cancels) the mediumSyncDelay timer when determining that the length of the first PPDU is less than or equal to the first value.

Optionally, when the medium synchronization delay timer on the second link is started, if the length of the first PPDU transmitted on the first link by the first multi-link device is less than or equal to the first value, the first multi-link device does not update the medium synchronization delay timer that is on the second link.

Optionally, when the medium synchronization delay timer on the second link is started, if the length of the PPDU transmitted on the first link by the first multi-link device is greater than the first value, the first multi-link device needs to update the medium synchronization delay timer that is on the second link. That the first multi-link device updates the medium synchronization delay timer that is on the second link may be understood as: updating the medium synchronization delay timer that is on the second link to an initial value of the medium synchronization delay timer existing when the medium synchronization delay timer is started, which is equivalent to restarting the medium synchronization delay timer that is on the second link. On the contrary, that the first multi-link device does not update the medium synchronization delay timer that is on the second link may be understood as: not updating the medium synchronization delay timer that is on the second link to an initial value of the medium synchronization delay timer existing when the medium synchronization delay timer is started.

Optionally, the first value may be a fixed value stipulated in a protocol, for example, 50 μs, 100 μs, or 200 μs.

Optionally, the first value may be 28 μs. 28 μs is a PPDU length existing when CTS and ACK frames are transmitted in a format of a 24 Mbps non-HT PPDU or a 24 Mbps non-HT duplicate PPDU.

Optionally, the first value may be 32 μs. 32 μs is a PPDU length existing when a BA (block acknowledge, block ACK) frame with a bitmap length of 64 is transmitted in a format of a 24 Mbps non-HT PPDU or a 24 Mbps non-HT duplicate PPDU.

Optionally, the first value may be 44 μs. 44 μs is a PPDU length existing when CTS and ACK frames are transmitted in a format of a 6 Mbps non-HT PPDU or a 6 Mbps non-HT duplicate PPDU.

Optionally, the first value may be 40 μs. 40 μs is a PPDU length existing when a BA frame with a bitmap length of 256 is transmitted in a format of a 24 Mbps non-HT PPDU or a 24 Mbps non-HT duplicate PPDU.

Optionally, the first value may be 36 μs. 36 μs is a PPDU length existing when a QoS-Null frame is transmitted in a format of a 24 Mbps non-HT PPDU or a 24 Mbps non-HT duplicate PPDU.

Optionally, the first value may be 68 μs. 68 μs is a PPDU length existing when a BA frame with a bitmap length of 64 is transmitted in a format of a 6 Mbps non-HT PPDU or a 6 Mbps non-HT duplicate PPDU.

Optionally, the first value may be alternatively determined by an access point (or an AP MLD) and transmitted to a station (that is, a non-AP MLD). Specifically, before step S201, the channel access method for a multi-link device in this embodiment of this application may further include: Step S202: A second multi-link device transmits indication information, where the indication information is used to indicate the first value. Correspondingly, the first multi-link device receives the indication information. The indication information may be carried in a beacon frame, an association response frame, or a reassociation response frame. The first multi-link device may be a non-STR MLD, and specifically, may be a non-AP MLD of a non-STR. The second multi-link device may be an STR MLD, and specifically, may be an AP MLD of an STR.

In an implementation, the indication information may be located in a multi-link element. FIG. 6A is a schematic diagram of a frame structure of a multi-link element according to an embodiment of this application. As shown in FIG. 6A, the multi-link element may include an element ID field, a length field, an element ID extension field, a multi-link control field, a medium synchronization delay timer threshold (mediumSyncDelay timer threshold) field, an optional subelements field, and the like. The medium synchronization delay timer threshold field is used to indicate the first value.

In another implementation, the indication information may be located in an EHT operation element. FIG. 6B is a schematic diagram of a frame structure of an EHT operation element according to an embodiment of this application. As shown in FIG. 6B, the EHT operation element may include an element ID field, a length field, an element ID extension field, a medium synchronization delay timer threshold (mediumSyncDelay timer threshold) field, and the like. The medium synchronization delay timer threshold field is used to indicate the first value.

In still another implementation, a new information element may be alternatively defined to carry the indication information. The new information element is used to carry a configuration parameter of a non-STR MLD. Optionally, the new information element may be referred to as a non-STR MLD parameter set element. It may be understood that the new information element may have another name. This is not limited in this embodiment of this application. FIG. 6C is a schematic diagram of a frame structure of a non-STR MLD parameter set element according to an embodiment of this application. As shown in FIG. 6C, the non-STR MLD parameter set element may include an element ID field, a length field, an element ID extension field, a medium synchronization delay timer threshold (mediumSyncDelay timer threshold) field, and the like. The medium synchronization delay timer threshold field is used to indicate the first value.

Optionally, when the length of the first PPDU is greater than the first value, the first multi-link device may start the medium synchronization delay timer on the second link. During a time period during which the medium synchronization delay timer runs, the first multi-link device may use a more conservative channel access mechanism on the second link. The more conservative channel access mechanism includes but is not limited to: (1) using a lower energy detection threshold (which is an ED threshold lower than −62 dBm herein) to determine whether a channel is busy; and (2) being mandatory to transmit an RTS frame to attempt to detect availability of a channel. Optionally, there can be only one attempt (or only one transmission of the RTS frame) or a limited quantity of attempts. It may be understood that when the length of the first PPDU is equal to the first value, an operation performed by the first multi-link device may be either not starting the medium synchronization delay timer on the second link or starting the medium synchronization delay timer on the second link. In this embodiment of this application, the operation performed by the first multi-link device when the length of the first PPDU is equal to the first value may be set based on an actual situation.

Optionally, before starting the medium synchronization delay timer on the second link, the first multi-link device may determine an initial value that is of the medium synchronization delay timer and that corresponds to the length of the first PPDU. It may be understood that an initial value of the medium synchronization delay timer started on the second link by the first multi-link device is the determined initial value that corresponds to the length of the first PPDU.

A mapping relationship between a PPDU length and an initial value (or initial duration) of a medium synchronization delay timer may be stipulated in a standard protocol. Alternatively, before the first multi-link device transmits the first PPDU on the first link, the second multi-link device transmits first indication information. Correspondingly, the first multi-link device receives the first indication information. The first indication information is used to indicate the mapping relationship between a PPDU length and an initial value (or initial duration) of a medium synchronization delay timer.

Optionally, after or at a time of starting the medium synchronization delay timer on the second link, the first multi-link device determines an energy detection threshold corresponding to the length of the first PPDU, and when performing channel contention on the second link, the first multi-link device sets an energy detection threshold used by a CCA operation to a threshold corresponding to the length of the first PPDU.

A mapping relationship between a PPDU length and an energy detection threshold may be stipulated in a standard protocol. Alternatively, before the first multi-link device transmits the first PPDU on the first link, the second multi-link device transmits second indication information. Correspondingly, the first multi-link device receives the second indication information. The second indication information is used to indicate the mapping relationship between a PPDU length and an energy detection threshold.

It may be understood that the first indication information and the second indication information may be a piece of indication information. That is, a piece of indication information indicates both the mapping relationship between a PPDU length and an initial value (or initial duration) of a medium synchronization delay timer and the mapping relationship between a PPDU length and an energy detection threshold. In other words, the first indication information and the second indication information are carried in a frame.

It can be learned that in this embodiment of this application, after transmitting a short frame on one link, a non-STR MLD is constrained from starting the mediumSyncDelay timer on another link; or when channel contention is performed on another link, the energy detection threshold used by CCA is set to −62 dBm; or there is no need to use an RTS frame on another link to attempt to detect protection/availability of a channel. Therefore, channel access efficiency or a channel access success rate of the non-STR MLD on the another link is improved, or channel access opportunities of the non-STR MLD on the another link are increased.

In an optional embodiment, the "length of the first PPDU" may be replaced with a "length (in a unit of bytes or bits) of a medium access control (medium access control, MAC) frame in the first PPDU". Correspondingly, step S301 may be replaced with: When a length of a MAC frame in a first PPDU transmitted on a first link by a first multi-link device is less than or equal to a second value, the first multi-link device does not start a medium synchronization delay timer on a second link, where the first multi-link device is not allowed to perform simultaneous transmitting and receiving on the first link and the second link.

In another optional embodiment, the channel access methods provided in Embodiment 1 and Embodiment 2 may be further applied to a single-link and multi-access channel scenario. Two channels are used as an example. It is assumed that an AP can use two channels for channel access, but can complete access on only one of the channels at a time, and cannot simultaneously access two channels. Specifically, the AP performs channel contention on a primary channel (primary channel), for example, a first channel. When the primary channel is busy, the AP may switch to the other channel (for example, a second channel) to perform channel contention. After a back-off counter on the second channel backs off to 0, the AP performs transmission on the second channel.

For the single-link and multi-access channel scenario, this embodiment of this application proposes: After the AP transmits a short frame (for example, an RTS frame, a CTS frame, a block acknowledge (BA) frame, a BSR frame, a BQR frame, a PS-Poll frame, or an NDP frame) on the second channel, the AP does not start a timer on the first channel. The timer may be a medium synchronization delay timer. Optionally, this embodiment of this application further proposes: The AP transmits a first PPDU on the second channel; and when a PPDU length of the first PPDU is less than or equal to a first value, the AP does not start the medium synchronization delay timer on the first channel.

Optionally, that the AP does not start a timer on the first channel may be understood as (may be described as): When the AP performs channel contention on the first channel, an energy detection threshold used by a CCA operation is a first threshold; or after a back-off counter on the first channel backs off to 0, the AP is allowed to directly transmit a frame other than an RTS frame and an MU-RTS frame. In other words, after the back-off counter on the first channel backs off to 0, the AP does not transmit an RTS/MU-RTS frame to attempt to detect protection/availability of a channel. The first threshold may be −62 dBm.

It may be understood that the second channel in this embodiment of this application is equivalent to the first links in Embodiment 1 and Embodiment 2, and the first channel in this embodiment of this application is equivalent to the second links in Embodiment 1 and Embodiment 2.

It can be learned that the channel access method provided in this embodiment of this application may be further applicable to a single-link and multi-access channel scenario, thereby expanding a scenario of the method and improving channel access efficiency or a channel access success rate of the AP on the first channel.

Embodiment 3

Embodiment 3 of this application provides a method for determining initial duration of a medium synchronization delay timer. According to the method for determining initial duration of a medium synchronization delay timer, initial duration of a medium synchronization delay timer is determined based on a length of a frame transmitted on a first link (or a second channel).

Figures 7, 8:
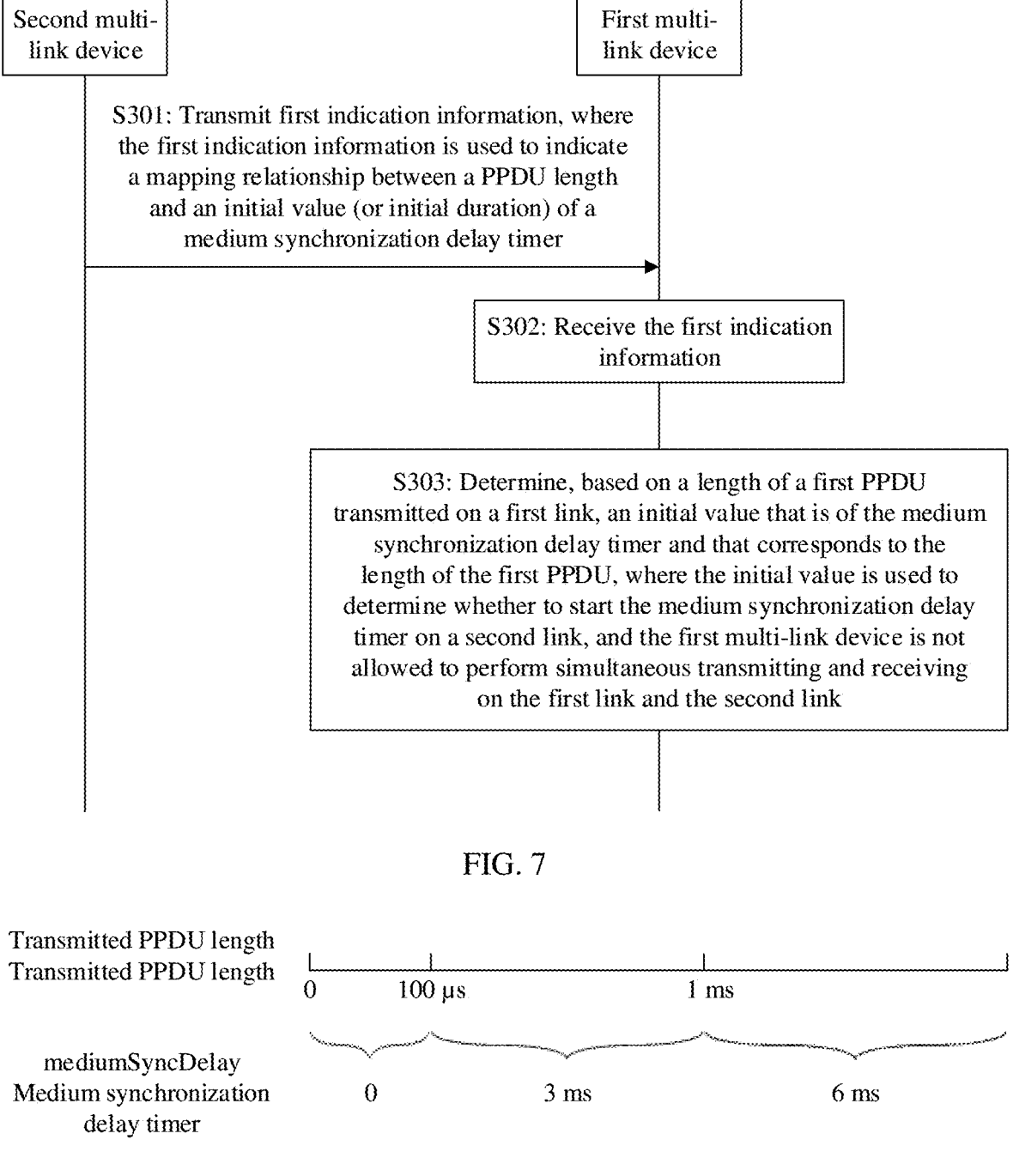
FIG. 7 is a schematic flowchart of a method for determining initial duration of a medium synchronization delay timer according to an embodiment of this application.
FIG. 8 is a schematic diagram of a mapping relationship between a PPDU length and an initial value of a medium synchronization delay timer according to an embodiment of this application.

FIG. 7 is a schematic flowchart of a method for determining initial duration of a medium synchronization delay timer according to an embodiment of this application. As shown in FIG. 7, the method for determining initial duration of a medium synchronization delay timer includes but is not limited to the following steps.

S301: A second multi-link device transmits first indication information, where the first indication information is used to indicate a mapping relationship between a PPDU length/byte length and an initial value (or initial duration) of a medium synchronization delay timer.

Specifically, the second multi-link device may be an AP MLD, and the AP MLD is capable of STR. The AP MLD may transmit the first indication information on a first link or another link. This is not limited in this embodiment of this application. The first indication information may be used to indicate the mapping relationship between a PPDU length and an initial value (or initial duration) of a medium synchronization delay timer.

In an example, FIG. 8 is a schematic diagram of a mapping relationship between a PPDU length and an initial value of a medium synchronization delay timer according to an embodiment of this application. As shown in FIG. 8, when the PPDU length is in a range of 0 to 100 μs (microseconds) (that is, an interval [0, 100 μs], an interval (0, 100 μs), an interval (0, 100 μs], or an interval [0, 100 μs)), the initial value of the medium synchronization delay timer is 0 ms; when the PPDU length is in a range of 100 μs to 1 ms (that is, an interval [100 μs, 1000 μs], an interval (100 μs, 1000 μs), an interval (100 μs, 1000 μs], or an interval [100 μs, 1000 μs)), the initial value of the medium synchronization delay timer is 3 ms; and when the PPDU length is greater than or equal to 1 ms, the initial value of the medium synchronization delay timer is 6 ms.

The mapping relationship shown in FIG. 8 may be summarized as that shown in Table 1 below.

TABLE 1

| PPDU length | Initial value (or initial duration) of the medium synchronization delay timer |
|---|---|
| ≤100 μs | 0 |
| ≥100 μs and ≤1 ms | 3 ms |
| ≥1 ms | 6 ms |

It may be understood that the mapping relationship shown in FIG. 8 and Table 1 is merely an example, and in actual application, the mapping relationship may be determined based on an actual application scenario. For example, the mapping relationship may alternatively be as follows: When the PPDU length is less than or equal to 50 μs, the initial value of the medium synchronization delay timer is 0 ms; when the PPDU length is greater than or equal to 50 μs and less than or equal to 200 μs, the initial value of the medium synchronization delay timer is 1 ms; when the PPDU length is greater than or equal to 200 μs and less than or equal to 500 μs, the initial value of the medium synchronization delay timer is 3 ms; and when the PPDU length is greater than or equal to 500 μs, the initial value of the medium synchronization delay timer is 5 ms. This is not limited in this embodiment of this application.

Optionally, the first indication information may include an array. For example, an array (0,100,0) indicates that when the PPDU length is in a range of 0 to 100 μs, the initial value of the medium synchronization delay timer is 0 ms; an array (100,1000,3) indicates that when the PPDU length is in a range of 100 μs to 1 ms, the initial value of the medium synchronization delay timer is 3 ms; and an array (1000, maximum PPDU length,6) indicates that when the PPDU length is in a range of 1 ms to the maximum PPDU length, the initial value of the medium synchronization delay timer is 6 ms. The maximum PPDU length is stipulated in a standard protocol.

Optionally, the first indication information may include two fields. A first field is used to determine N intervals. A second field is used to indicate an initial value that is of the medium synchronization delay timer and that corresponds to each of the N intervals.

The first field may include N+1 subfields. Values of the N+1 subfields increase monotonically, and values of two adjacent subfields can determine an interval. Therefore, the N+1 subfields can determine N intervals. For example, a value of a first subfield is 0, and a value of an $(N+1)^{th}$ subfield is a maximum PPDU length, or a value greater than the maximum PPDU length, for example, 6 ms. Optionally, the first subfield (or the (N+1)th subfield) may not be carried in the first field.

The second field includes N subfields. A value of a subfield represents an initial value that is of the medium synchronization delay timer and that corresponds to an interval.

S302: A first multi-link device receives the first indication information.

S303: The first multi-link device determines, based on a length of a first PPDU transmitted on the first link, an initial value that is of the medium synchronization delay timer and that corresponds to the length of the first PPDU. The initial value is used to determine whether to start the medium synchronization delay timer on a second link. The first multi-link device is not allowed to perform simultaneous transmitting and receiving on the first link and the second link.

Specifically, the first multi-link device may be a non-AP MLD, and the non-AP MLD is capable of non-STR. The first multi-link device may determine, based on the mapping relationship that is between a PPDU length and an initial value (or initial duration) of a medium synchronization delay timer and that is indicated by the first indication information, and based on the PPDU length of the first PPDU, the initial value (or initial duration) that is of the medium synchronization delay timer and that corresponds to the PPDU length of the first PPDU. For example, the mapping relationship is shown in Table 1 above, and it is assumed that the length of the first PPDU is 200 µs. In this case, the initial value (or initial duration) of the medium synchronization delay timer is 3 ms.

Optionally, the first multi-link device determines, based on the initial value (or initial duration) that is of the medium synchronization delay timer and that corresponds to the length of the first PPDU, whether to start the medium synchronization delay timer on the second link.

Specifically, if the initial value (or initial duration) of the medium synchronization delay timer is equal to 0, the first multi-link device does not start the medium synchronization delay timer on the second link; or if the initial value (or initial duration) of the medium synchronization delay timer is greater than 0, the first multi-link device starts the medium synchronization delay timer on the second link. The initial value/initial duration of the medium synchronization delay timer is the value determined in step S404.

That the first multi-link device starts the mediumSyncDelay timer on the second link may be understood as (or may be described as): During a time period during which the mediumSyncDelay timer runs, the first multi-link device may use a more conservative channel access mechanism on the second link. The more conservative channel access mechanism includes but is not limited to: (1) using a lower energy detection threshold (which is an ED threshold lower than −62 dBm herein) to determine whether a channel is busy; and (2) being mandatory to transmit an RTS frame to attempt to detect availability of a channel. Optionally, there can be only one attempt (or only one transmission of the RTS frame) or a limited quantity of attempts.

That the first multi-link device does not start the mediumSyncDelay timer on the second link may be understood as (or may be described as): When the first multi-link device performs channel contention on the second link, an energy detection threshold used by a CCA operation is a first threshold; or after a back-off counter on the second link backs off to 0, the first multi-link device is allowed to directly transmit a frame other than an RTS frame and an MU-RTS frame. The first threshold may be −62 dBm.

It may be understood that the method for determining initial duration of a medium synchronization delay timer provided in this embodiment of this application may be alternatively applied to a single-link and multi-access channel scenario. A first channel in the single-link and multi-access channel scenario is equivalent to the second link, and a second channel in the single-link and multi-access channel scenario is equivalent to the first link. Details are not described herein again.

It can be learned that in this embodiment of this application, the mapping relationship between a PPDU length and an initial value (or initial duration) of a medium synchronization delay timer is indicated by the first indication information, so that the first multi-link device determines, based on the mapping relationship and the length of the first PPDU transmitted on the first link, the initial value that is of the medium synchronization delay timer and that corresponds to the length of the first PPDU, does not start the mediumSyncDelay timer on the second link when the initial value is equal to 0, and starts the mediumSyncDelay timer on the second link when the initial value is greater than 0. Different PPDU lengths correspond to different initial values of the mediumSyncDelay timer, enabling more flexible setting of the mediumSyncDelay timer and improving channel access efficiency.

In an optional embodiment, the mapping relationship between a PPDU length and an initial value (or initial duration) of a medium synchronization delay timer may be stipulated in a standard protocol. When the mapping relationship is stipulated in a standard protocol, the method for determining initial duration of a medium synchronization delay timer shown in FIG. 7 may not include step S301 and step S302, that is, the method for determining initial duration of a medium synchronization delay timer may include step S303.

Embodiment 4

Embodiment 4 of this application provides a method for determining an energy detection threshold in a CCA process. According to the method for determining an energy detection threshold in a CCA process, an ED threshold used in a CCA process when backing-off is performed on a second link during a mediumSyncDelay is determined based on a length of a frame transmitted on a first link (or a second channel).

Figures 9, 10:
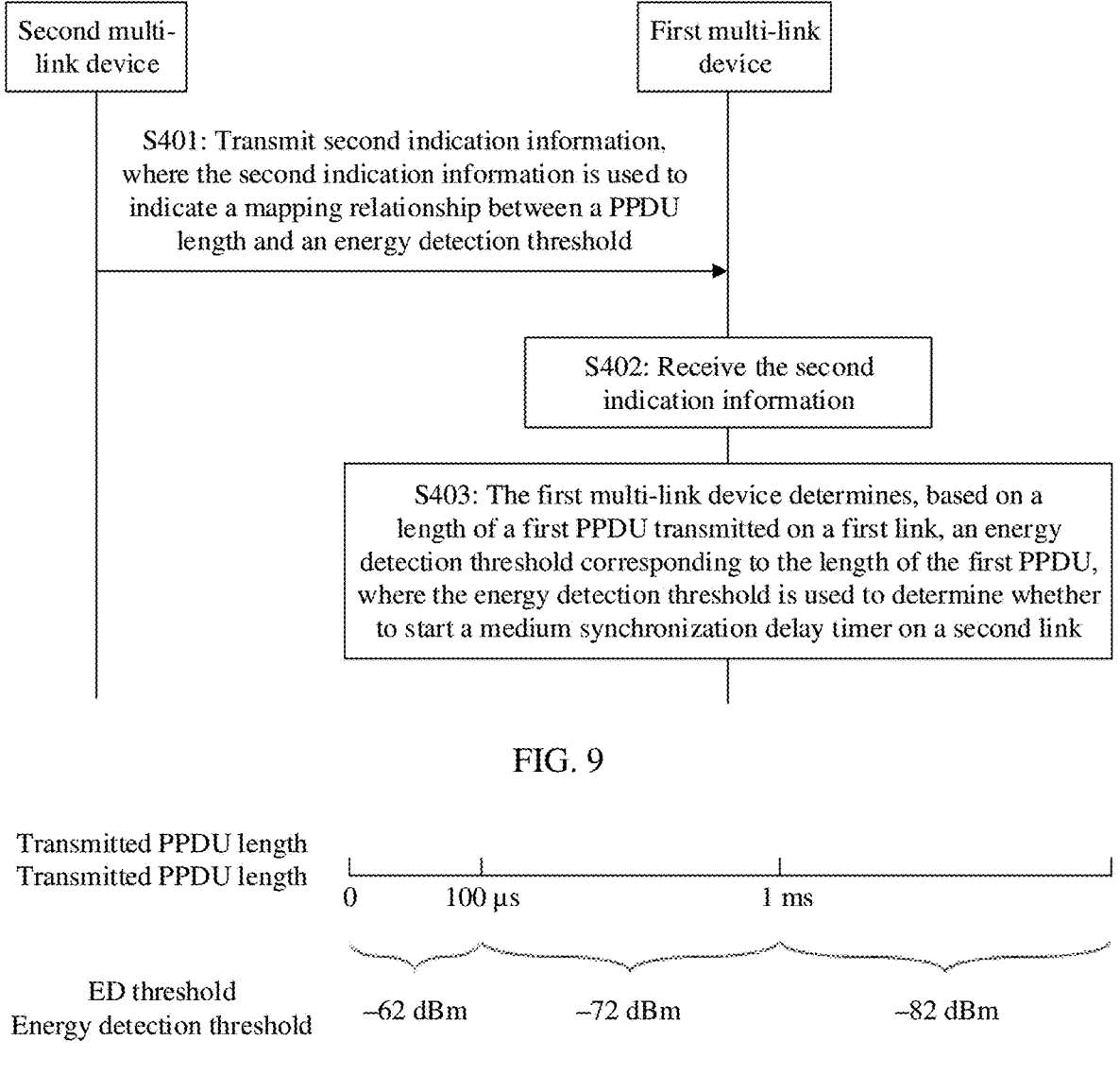
FIG. 9 is a schematic flowchart of a method for determining an energy detection threshold in a CCA process according to an embodiment of this application.
FIG. 10 is a schematic diagram of a mapping relationship between a PPDU length and an energy detection threshold according to an embodiment of this application.

FIG. 9 is a schematic flowchart of a method for determining an energy detection threshold in a CCA process according to an embodiment of this application. As shown in FIG. 9, the method for determining an energy detection threshold in a CCA process includes but is not limited to the following steps.

S401: A second multi-link device transmits second indication information, where the second indication information is used to indicate a mapping relationship between a PPDU length and an energy detection threshold.

Specifically, the second multi-link device may be an AP MLD, and the AP MLD is capable of STR. The AP MLD may transmit the second indication information on a first link or another link. This is not limited in this embodiment of this application. The second indication information may be used to indicate the mapping relationship between a PPDU length and an energy detection threshold.

In an example, FIG. 10 is a schematic diagram of a mapping relationship between a PPDU length and an energy detection threshold according to an embodiment of this application. As shown in FIG. 10, when the PPDU length is in a range of 0 to 100 µs (microseconds) (that is, an interval [0, 100 µs], an interval (0, 100 µs), an interval (0, 100 µs], or an interval [0, 100 µs)), the energy detection threshold is −62 dBm; when the PPDU length is in a range of 100 µs to 1 ms (that is, an interval [100 µs, 1000 µs], an interval (100 µs, 1000 µs), an interval (100 µs, 1000 µs], or an interval [100 µs, 1000 µs)), the energy detection threshold is −72 dBm; and when the PPDU length is greater than or equal to 1 ms, the energy detection threshold is −82 dBm.

The mapping relationship shown in FIG. 10 may be summarized as that shown in Table 2 below.

TABLE 2

| PPDU length | Energy detection threshold |
| --- | --- |
| ≤100 µs | −62 dBm |
| ≥100 µs and ≤1 ms | −72 dBm |
| ≥1 ms | −82 dBm |

It may be understood that the mapping relationship shown in FIG. 10 and Table 2 is merely an example, and in actual application, the mapping relationship may be determined based on an actual application scenario. For example, the mapping relationship may alternatively be as follows: When the PPDU length is less than or equal to 50 µs, the energy detection threshold is −62 dBm; when the PPDU length is greater than or equal to 50 µs and less than or equal to 200 µs, the energy detection threshold is −67 dBm; when the PPDU length is greater than or equal to 200 µs and less than or equal to 500 µs, the energy detection threshold is −72 dBm; and when the PPDU length is greater than or equal to 500 µs, the energy detection threshold is −82 dBm. This is not limited in this embodiment of this application.

Optionally, the second indication information may include an array. For example, an array (0,100,−62) indicates that when the PPDU length is in a range of 0 to 100 µs, the energy detection threshold is −62 dBm; an array (100, 1000,−72) indicates that when the PPDU length is in a range of 100 µs to 1 ms, the energy detection threshold is −72 dBm; and an array (1000,maximum PPDU length,−82) indicates that when the PPDU length is in a range of 1 ms to the maximum PPDU length, the energy detection threshold is −62 dBm. The maximum PPDU length is stipulated in a standard protocol.

Optionally, the second indication information may include two fields. A first field is used to determine N intervals. A second field is used to indicate an energy detection threshold corresponding to each of the N intervals.

The first field may include N+1 subfields. Values of the N+1 subfields increase monotonically, and values of two adjacent subfields can determine an interval. Therefore, the N+1 subfields can determine N intervals. For example, a value of a first subfield is 0, and a value of an $(N+1)^{th}$ subfield is a maximum PPDU length, or a value greater than the maximum PPDU length, for example, 6 ms. Optionally, the first subfield (or the (N+1)th subfield) may not be carried in the first field.

The second field includes N subfields. A value of a subfield represents an energy detection threshold corresponding to an interval.

S402: A first multi-link device receives the second indication information.

S403: The first multi-link device determines, based on a length of a first PPDU transmitted on the first link, an energy detection threshold corresponding to the length of the first PPDU. The energy detection threshold is used to determine whether to start the medium synchronization delay timer on a second link.

Specifically, the first multi-link device may be a non-AP MLD, and the non-AP MLD is capable of non-STR. The first multi-link device may determine, based on the mapping relationship that is between a PPDU length and an energy detection threshold and that is indicated by the second indication information, and based on the length of the first PPDU, the energy detection threshold corresponding to the length of the first PPDU. For example, the mapping relationship is shown in Table 2 above, and it is assumed that the length of the first PPDU is 200 µs. In this case, the energy detection threshold is −72 dBm.

Optionally, the first multi-link device determines, based on the energy detection threshold corresponding to the length of the first PPDU, whether to start the medium synchronization delay timer on the second link. Specifically, if the energy detection threshold determined in step S403 is equal to −62 dBm, the first multi-link device does not start the medium synchronization delay timer on the second link; or if the energy detection threshold determined in step S403 is less than −62 dBm, the first multi-link device starts the medium synchronization delay timer on the second link. If the first multi-link device starts the medium synchronization delay timer on the second link, it indicates that during a mediumSyncDelay, the first multi-link device sets an energy detection threshold used by CCA to the energy detection threshold corresponding to the length of the first PPDU (that is, the energy detection threshold determined in step S504) when performing channel contention on the second link.

That the first multi-link device starts the mediumSyncDelay timer on the second link may be understood as (or may be described as): During the mediumSyncDelay, the first multi-link device may use a more conservative channel access mechanism on the second link. The more conservative channel access mechanism includes but is not limited to: (1) using a lower energy detection threshold (which is an ED threshold lower than −62 dBm herein) to determine whether a channel is busy; and (2) being mandatory to transmit an RTS frame to attempt to detect availability of a channel. Optionally, there can be only one attempt (or only one transmission of the RTS frame) or a limited quantity of attempts.

That the first multi-link device does not start the mediumSyncDelay timer on the second link may be understood as (or may be described as): When the first multi-link device performs channel contention on the second link, an energy detection threshold used by a CCA operation is a first threshold; or after a back-off counter on the second link backs off to 0, the first multi-link device is allowed to directly transmit a frame other than an RTS frame and an MU-RTS frame. The first threshold may be −62 dBm.

It may be understood that the method for determining an energy detection threshold in a CCA process provided in this embodiment of this application may be alternatively applied to a single-link and multi-access channel scenario. A first channel in the single-link and multi-access channel scenario is equivalent to the second link, and a second channel in the single-link and multi-access channel scenario is equivalent to the first link. Details are not described herein again.

It can be learned that in this embodiment of this application, the mapping relationship between a PPDU length and an energy detection threshold is indicated by the second indication information, so that the first multi-link device determines, based on the mapping relationship and the length of the first PPDU transmitted on the first link, the energy detection threshold corresponding to the length of the first PPDU, does not start the mediumSyncDelay timer on the second link when the energy detection threshold is equal to −62 dBm, and starts the mediumSyncDelay timer on the second link when the energy detection threshold is less than −62 dBm. Different PPDU lengths correspond to different energy detection thresholds. In this case, a channel access mechanism used on the second link is more flexible, improving channel access efficiency.

In an optional embodiment, the mapping relationship between a PPDU length and an energy detection threshold may be stipulated in a standard protocol. When the mapping relationship is stipulated in a standard protocol, the method for determining an energy detection threshold in a CCA process shown in FIG. 9 may not include step S401 and step S402, that is, the method for determining an energy detection threshold in a CCA process may include step S403.

In another optional embodiment, the first indication information in Embodiment 3 and the second indication information in Embodiment 4 may be a piece of indication information, or the first indication information and the second indication information are carried in a same frame. Therefore, Embodiment 3 and Embodiment 4 may be combined into an embodiment. Specifically, a second multi-link device transmits indication information, where the indication information is used to indicate a mapping relationship between a PPDU length and an initial value (or initial duration) of a medium synchronization delay timer and a mapping relationship between a PPDU length and an energy detection threshold; a first multi-link device receives the indication information; the first multi-link device transmits a first PPDU on a first link; and the first multi-link device determines, based on a length of the first PPDU, an initial value that is of the medium synchronization delay timer and that corresponds to the length of the first PPDU, and an energy detection threshold corresponding to the length of the first PPDU. Optionally, the first multi-link device may further determine, based on the energy detection threshold corresponding to the length of the first PPDU or based on the initial value that is of the medium synchronization delay timer and that corresponds to the length of the first PPDU, whether to start the medium synchronization delay timer on the second link.

The foregoing content describes in detail the methods provided in this application. To better implement the foregoing solutions in embodiments of this application, embodiments of this application further provide corresponding apparatuses or devices.

In embodiments of this application, the communication device may be divided into function modules based on the foregoing method examples. For example, each function module may be divided in correspondence to each function, or two or more functions may be integrated into one processing module. The integrated module may be implemented in a form of hardware, or may be implemented in a form of a software function module. It should be noted that the division of the modules in embodiments of this application is an example, and is merely logical function division, and there may be another division manner during actual implementation.

Figure 11:
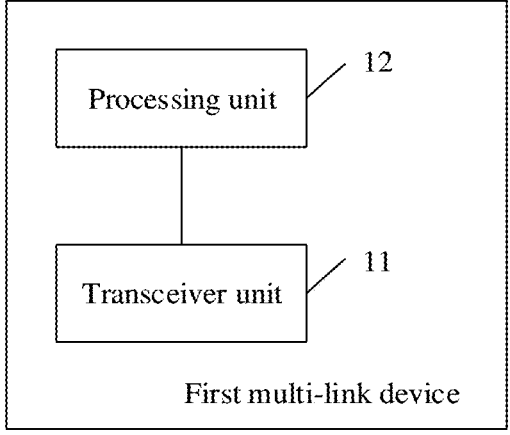
FIG. 11 is a schematic diagram of a structure of a first multi-link device according to an embodiment of this application.

When an integrated unit is used, FIG. 11 is a schematic diagram of a structure of a first multi-link device according to an embodiment of this application. As shown in FIG. 11, the first multi-link device includes a transceiver unit 11 and a processing unit 12.

In a design, the processing unit 12 is configured to: when a length of a first PPDU transmitted on a first link by the first multi-link device is less than or equal to a first value, skip starting a medium synchronization delay timer on a second link. The first multi-link device is not allowed to perform simultaneous transmitting and receiving on the first link and the second link.

The processing unit 12 is specifically configured to: when channel contention is performed on the second link, set an energy detection threshold used by a CCA operation to a first threshold. Alternatively, the transceiver unit 11 is configured to: after a back-off counter on the second link backs off to 0, transmit a frame other than an RTS frame and an MU-RTS frame. The first threshold may be −62 dBm.

It should be understood that the first multi-link device in this design may correspondingly execute Embodiment 2, and the operations or functions of the units in the first multi-link device are separately used for implementing corresponding operations performed by the first multi-link device in Embodiment 2. For brevity, details are not described herein again.

In a design, the processing unit 12 is configured to: when a type of a first frame transmitted on the first link by the first multi-link device is a first type, skip starting the medium synchronization delay timer on the second link. The first multi-link device is not allowed to perform simultaneous transmitting and receiving on the first link and the second link.

The processing unit 12 is specifically configured to: when channel contention is performed on the second link, set the energy detection threshold used by a CCA operation to the first threshold. Alternatively, the transceiver unit 11 is further configured to: after the back-off counter on the second link backs off to 0, transmit a frame other than an RTS frame and an MU-RTS frame. The first threshold may be −62 dBm.

It should be understood that the first multi-link device in this design may correspondingly execute Embodiment 1, and the operations or functions of the units in the first multi-link device are separately used for implementing corresponding operations performed by the first multi-link device in Embodiment 1. For brevity, details are not described herein again.

In a design, the transceiver unit 11 is configured to receive first indication information, where the first indication information is used to indicate a mapping relationship between a PPDU length and an initial value of a medium synchronization delay timer; and the processing unit 12 is configured to determine, based on the length of the first PPDU transmitted on the first link, an initial value that is of the medium synchronization delay timer and that corresponds to the length of the first PPDU. The initial value is used to determine whether to start the medium synchronization delay timer on the second link. The first multi-link device is not allowed to perform simultaneous transmitting and receiving on the first link and the second link.

Optionally, the processing unit 12 is further configured to determine, based on the initial value that is of the medium synchronization delay timer and that corresponds to the length of the first PPDU, whether to start the medium synchronization delay timer on the second link.

Optionally, the processing unit 12 is specifically configured to: if the determined initial value of the medium synchronization delay timer is equal to 0, skip starting the medium synchronization delay timer on the second link; or if the determined initial value of the medium synchronization delay timer is equal to 0, start the medium synchronization delay timer on the second link.

It should be understood that the first multi-link device in this design may correspondingly execute Embodiment 3, and the operations or functions of the units in the first multi-link device are separately used for implementing corresponding operations performed by the first multi-link device in Embodiment 3. For brevity, details are not described herein again.

In a design, the transceiver unit 11 is configured to receive second indication information, where the second indication information is used to indicate a mapping relationship between a PPDU length and an energy detection threshold; and the processing unit 12 is configured to determine, based on the length of the first PPDU transmitted on the first link, an initial value that is of the medium synchronization delay timer and that corresponds to the length of the first PPDU. The communication apparatus is not allowed to perform simultaneous transmitting and receiving on the first link and the second link.

Optionally, the processing unit 12 is further configured to determine, based on the energy detection threshold corresponding to the length of the first PPDU, whether to start the medium synchronization delay timer on the second link.

Optionally, the processing unit 12 is specifically configured to: if the determined energy detection threshold is equal to −62 dBm, skip starting the medium synchronization delay timer on the second link; or if the determined energy detection threshold is less than −62 dBm, start the medium synchronization delay timer on the second link.

It should be understood that the first multi-link device in this design may correspondingly execute Embodiment 4, and the operations or functions of the units in the first multi-link device are separately used for implementing corresponding operations performed by the first multi-link device in Embodiment 4. For brevity, details are not described herein again.

Figure 12:
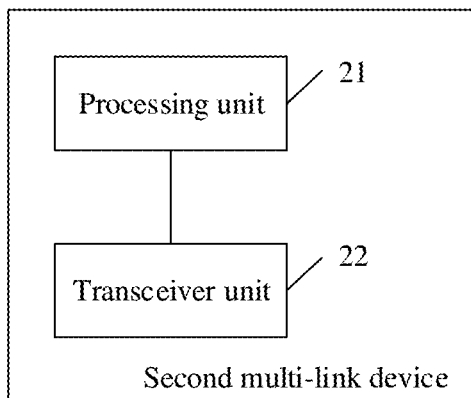
FIG. 12 is a schematic diagram of a structure of a second multi-link device according to an embodiment of this application.

FIG. 12 is a schematic diagram of a structure of a second multi-link device according to an embodiment of this application. As shown in FIG. 12, the second multi-link device includes a processing unit 21 and a transceiver unit 22.

In a design, the processing unit 21 is configured to generate first indication information, where the first indication information is used to indicate a mapping relationship between a PPDU length and an initial value (or initial duration) of a medium synchronization delay timer; and the transceiver unit 22 is configured to transmit the first indication information.

It should be understood that the second multi-link device in this design may correspondingly execute Embodiment 3, and the operations or functions of the units in the second multi-link device are separately used for implementing corresponding operations performed by the second multi-link device in Embodiment 3. For brevity, details are not described herein again.

In another design, the processing unit 21 is configured to generate second indication information, where the second indication information is used to indicate a mapping relationship between a PPDU length and an energy detection threshold; and the transceiver unit 22 is configured to transmit the second indication information.

It should be understood that the second multi-link device in this design may correspondingly execute Embodiment 4, and the operations or functions of the units in the second multi-link device are separately used for implementing corresponding operations performed by the second multi-link device in Embodiment 4. For brevity, details are not described herein again.

The foregoing describes the first multi-link device and the second multi-link device in embodiments of this application. The following describes possible product forms of the first multi-link device and the second multi-link device. It should be understood that any product in any form with functions of the first multi-link device shown in FIG. 11, and any product in any form with functions of the second multi-link device shown in FIG. 12 fall within the protection scope of embodiments of this application. It should be further understood that the following descriptions are merely examples, and do not limit that product forms of the first multi-link device and the second multi-link device in embodiments of this application are limited thereto.

In a possible product form, the first multi-link device and the second multi-link device described in embodiments of this application may be implemented by a generic bus architecture.

The first multi-link device includes a processor and a transceiver that communicates with the processor through an internal connection.

In a design, the processor is configured to: when a length of a first PPDU transmitted on a first link by the first multi-link device is less than or equal to a first value, skip starting a medium synchronization delay timer on a second link. The first multi-link device is not allowed to perform simultaneous transmitting and receiving on the first link and the second link. Optionally, the transceiver is configured to transmit the first PPDU on the first link.

In a design, the processor is configured to: when a type of a first frame transmitted on the first link by the first multi-link device is a first type, skip starting the medium synchronization delay timer on the second link. The first multi-link device is not allowed to perform simultaneous transmitting and receiving on the first link and the second link.

In a design, the transceiver is configured to receive first indication information, where the first indication information is used to indicate a mapping relationship between a PPDU length and an initial value of a medium synchronization delay timer; and the processor is configured to determine, based on the length of the first PPDU transmitted on the first link, an initial value that is of the medium synchronization delay timer and that corresponds to the length of the first PPDU. The initial value is used to determine whether to start the medium synchronization delay timer on the second link. The first multi-link device is not allowed to perform simultaneous transmitting and receiving on the first link and the second link.

In a design, the transceiver is configured to receive second indication information, where the second indication information is used to indicate a mapping relationship between a PPDU length/byte length and an energy detection threshold; and the processor is configured to determine, based on the length of the first PPDU transmitted on the first link, an initial value that is of the medium synchronization delay timer and that corresponds to the length of the first PPDU. The communication apparatus is not allowed to perform simultaneous transmitting and receiving on the first link and the second link.

The second multi-link device includes a processor and a transceiver that communicates with the processor through an internal connection.

In a design, the processor is configured to generate first indication information, where the first indication information is used to indicate a mapping relationship between a PPDU length and an initial value (or initial duration) of a medium synchronization delay timer; and the transceiver is configured to transmit the first indication information.

In another design, the processor is configured to generate second indication information, where the second indication information is used to indicate a mapping relationship between a PPDU length and an energy detection threshold; and the transceiver is configured to transmit the second indication information.

In a possible product form, the first multi-link device and the second multi-link device described in embodiments of this application may be implemented by a chip.

A chip implementing the first multi-link device includes a processing circuit and an input/output interface that communicates with the processing circuit through an internal connection.

In a design, the input/output interface is configured to receive code instructions and transmit the code instructions to the processing circuit; and the processing circuit is configured to: when a length of a first PPDU transmitted on a first link is less than or equal to a first value, skip starting a medium synchronization delay timer on a second link. The first multi-link device is not allowed to perform simultaneous transmitting and receiving on the first link and the second link.

In a design, the input/output interface is configured to receive code instructions and transmit the code instructions to the processing circuit; and the processing circuit is configured to: when a type of a first frame transmitted on the first link by the first multi-link device is a first type, skip starting the medium synchronization delay timer on the second link. The first multi-link device is not allowed to perform simultaneous transmitting and receiving on the first link and the second link.

In a design, a transceiver is configured to receive first indication information, and the input/output interface is configured to receive the first indication information from the transceiver, and transmit the first indication information to the processing circuit for processing, to obtain a mapping relationship that is between a PPDU length and an initial value (or initial duration) of the medium synchronization delay timer and that is indicated by the first indication information; and the processing circuit is configured to determine, based on the length of the first PPDU transmitted on the first link, an initial value that is of the medium synchronization delay timer and that corresponds to the length of the first PPDU. The initial value is used to determine whether to start the medium synchronization delay timer on the second link. The first multi-link device is not allowed to perform simultaneous transmitting and receiving on the first link and the second link.

In a design, the transceiver is configured to receive second indication information, and the input/output interface is configured to receive the second indication information from the transceiver, and transmit the second indication information to the processing circuit for processing, to obtain a mapping relationship that is between a PPDU length and an energy detection threshold and that is indicated by the second indication information; and the processing circuit is configured to determine, based on the length of the first PPDU transmitted on the first link, an energy detection threshold corresponding to the length of the first PPDU. The energy detection threshold is used to determine whether to start the medium synchronization delay timer on the second link. The first multi-link device is not allowed to perform simultaneous transmitting and receiving on the first link and the second link.

A chip implementing the second multi-link device includes a processing circuit and an input/output interface that communicates with the processing circuit through an internal connection.

In a design, the input/output interface is configured to receive code instructions and transmit the code instructions to the processing circuit; the processing circuit is configured to generate first indication information, where the first indication information is used to indicate a mapping relationship between a PPDU length and an initial value (or initial duration) of a medium synchronization delay timer; the input/output interface is configured to transmit the first indication information to a transceiver; and the transceiver is configured to transmit the first indication information.

In another design, the input/output interface is configured to receive code instructions and transmit the code instructions to the processing circuit; the processing circuit is configured to generate second indication information, where the second indication information is used to indicate a mapping relationship between a PPDU length and an energy detection threshold; the input/output interface is configured to transmit the second indication information to the transceiver; and the transceiver is configured to transmit the second indication information.

In a possible product form, the first multi-link device and the second multi-link device described in embodiments of this application may be alternatively implemented by using the following: one or more FPGAs (field programmable gate array), a PLD (programmable logic device), a controller, a state machine, gate logic, a discrete hardware component, any other suitable circuit, or any combination of circuits capable of performing various functions described throughout this application.

It should be understood that the communication apparatuses in various product forms have any function of the first multi-link device or the second multi-link device in the foregoing method embodiments. Details are not described herein again.

An embodiment of this application further provides a computer-readable storage medium. The computer-readable storage medium stores instructions, and when the instructions are run on a computer, the computer is enabled to perform the method in any one of the foregoing embodiments.

An embodiment of this application further provides a computer program product. When the computer program product is run on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, so that the apparatus performs the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk drive, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer-readable storage medium and a communication medium. The communication medium includes any medium that enables a computer program to be transmitted from one place to another. The storage medium may be any available medium accessible to a general-purpose or dedicated computer.

In the foregoing specific embodiments, the objectives, technical solutions, and benefits of this application are further described in detail. It should be understood that the foregoing descriptions are merely specific implementations of this application, but are not intended to limit the protection scope of this application. Any modification, equivalent replacement, improvement, or the like made based on technical solutions of this application shall fall within the protection scope of this application.

What is claimed is:

1. A method for a first multi-link device, the method comprising:
    when a length of a first physical layer protocol data unit (PPDU) transmitted on a first link by the first multi-link device is less than or equal to a first threshold, skipping starting, by the first multi-link device, a medium synchronization delay timer on a second link, wherein the first multi-link device is not capable of performing simultaneous transmitting and receiving on the first link and the second link; and
    wherein skipping starting, by the first multi-link device, the medium synchronization delay timer on the second link comprises:
    setting an energy detection threshold that is used by clear channel assessment (CCA) performed on the second link to a second threshold, wherein the second threshold is −62 dBm.

2. The method according to claim 1, further comprising:
    receiving, by the first multi-link device, the first threshold, wherein the first threshold is carried in a beacon frame, an association response frame, or a reassociation response frame.

3. The method according to claim 1, further comprising:
    when the length of the first PPDU is greater than the first threshold, determining, by the first multi-link device, an initial value that is of the medium synchronization delay timer and that corresponds to the length of the first PPDU, and starting the medium synchronization delay timer with the initial value on the second link.

4. The method according to claim 3, further comprising:
    receiving, by the first multi-link device, first indication information, wherein the first indication information indicates a mapping relationship between one or more PPDU lengths and one or more initial values of the medium synchronization delay timer.

5. A first multi-link device, comprising:
a processor; and
a memory storing a computer program, wherein the processor is configured to execute the computer program stored in the memory, and executing the computer program stored in the memory enables the first multi-link device to perform:
    when a length of a first physical layer protocol data unit (PPDU) transmitted on a first link by the first multi-link device is less than or equal to a first threshold, skipping starting a medium synchronization delay timer on a second link, wherein the first multi-link device is not capable of performing simultaneous transmitting and receiving on the first link and the second link; and
wherein skipping starting the medium synchronization delay timer on the second link comprises:
setting an energy detection threshold that is used by clear channel assessment (CCA) performed on the second link to a second threshold, wherein the second threshold is −62 dBm.

6. The first multi-link device according to claim 5, wherein executing the computer program stored in the memory further enables the first multi-link device to perform:
    receiving the first threshold, wherein the first threshold is carried in a beacon frame, an association response frame, or a reassociation response frame.

7. The first multi-link device according to claim 5, wherein executing the computer program stored in the memory further enables the first multi-link device to perform:
    when the length of the first PPDU is greater than the first threshold, determining an initial value that is of the medium synchronization delay timer and that corresponds to the length of the first PPDU, and starting the medium synchronization delay timer with the initial value on the second link.

8. The first multi-link device according to claim 7, wherein executing the computer program stored in the memory further enables the first multi-link device to perform:
    receiving first indication information, wherein the first indication information indicates a mapping relationship between one or more PPDU lengths and one or more initial values of the medium synchronization delay timer.

9. A first multi-link device, comprising:
an input/output interface; and
a processing circuit;
wherein the input/output interface is configured to receive code instructions and transmit the code instructions to the processing circuit; and
wherein the processing circuit is configured to:
    when a length of a first physical layer protocol data unit (PPDU) transmitted on a first link is less than or equal to a first threshold, skip starting a medium synchronization delay timer on a second link, wherein the first multi-link device is not capable of performing simultaneous transmitting and receiving on the first link and the second link; and
wherein skipping starting the medium synchronization delay timer on the second link comprises:

setting an energy detection threshold that is used by clear channel assessment (CCA) performed on the second link to a second threshold, wherein the second threshold is –62 dBm.

10. The first multi-link device according to claim 9, wherein the input/output interface is further configured to receive the first threshold, and the first threshold is carried in a beacon frame, an association response frame, or a reassociation response frame.

11. The first multi-link device according to claim 9, wherein the processing circuit is further configured to:

when the length of the first PPDU is greater than the first threshold, determine an initial value that is of the medium synchronization delay timer and that corresponds to the length of the first PPDU, and start the medium synchronization delay timer with the initial value on the second link.

12. The first multi-link device according to claim 11, wherein the input/output interface is further configured to:

receive first indication information, wherein the first indication information indicates a mapping relationship between one or more PPDU lengths and one or more initial values of the medium synchronization delay timer.

13. The first multi-link device according to claim 5, wherein executing the computer program stored in the memory further enables the first multi-link device to perform:

receiving the first threshold, wherein the first threshold is carried in an association response frame.

14. The first multi-link device according to claim 5, wherein executing the computer program stored in the memory further enables the first multi-link device to perform:

receiving the first threshold, wherein the first threshold is carried in a reassociation response frame.

15. The method according to claim 1, further comprising:

receiving, by the first multi-link device, the first threshold, wherein the first threshold is carried in an association response frame.

16. The method according to claim 1, further comprising:

receiving, by the first multi-link device, the first threshold, wherein the first threshold is carried in a reassociation response frame.

17. The first multi-link device according to claim 9, wherein the input/output interface is further configured to receive the first threshold, and the first threshold is carried in an association response frame.

18. The first multi-link device according to claim 9, wherein the input/output interface is further configured to receive the first threshold, and the first threshold is carried in a reassociation response frame.

\* \* \* \* \*